(12) United States Patent
Singla et al.

(10) Patent No.: US 12,530,673 B2
(45) Date of Patent: *Jan. 20, 2026

(54) SMART PAYMENT CARD, AND COMPUTING SYSTEMS AND METHODS FOR CONFIGURING SMART PAYMENT CARD AND PROCESSING TRANSACTIONS INVOLVING SMART PAYMENT CARD

(71) Applicant: Capital One Financial Corporation, McLean, VA (US)

(72) Inventors: Sanjeev Singla, Novi, MI (US); Shriprakash Adikumar Band, Rolling Meadows, IL (US); Bharanicharan Malli Sathyamoorthy, Naperville, IL (US)

(73) Assignee: Capital One Financial Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,791

(22) Filed: Sep. 16, 2024

(65) Prior Publication Data

US 2025/0117776 A1 Apr. 10, 2025

Related U.S. Application Data

(63) Continuation of application No. 18/306,850, filed on Apr. 25, 2023, now Pat. No. 12,093,925.

(51) Int. Cl.
*G06Q 20/00* (2012.01)
*G06K 19/07* (2006.01)
(Continued)

(52) U.S. Cl.
CPC ....... *G06Q 20/341* (2013.01); *G06K 19/0718* (2013.01); *G06K 19/07707* (2013.01);
(Continued)

(58) Field of Classification Search
CPC ............... G06Q 20/341; G06Q 20/322; G06Q 20/40145; G06V 40/1365; G06K 19/0718; G06K 19/07707
(Continued)

(56) References Cited

U.S. PATENT DOCUMENTS 6,325,285 B1 12/2001 Baratelli
10,026,077 B2 7/2018 Hosny et al.
(Continued)

FOREIGN PATENT DOCUMENTS

GB 2564655 A 1/2019

OTHER PUBLICATIONS

SmartMetric. Biometric Credit Card. My Card Protected by My Fingerprint Biometrics—All the Time. Copyright 2022, 5 pages [retrieved online]. Retrieved from: URL:https://www.smartmetric.com/biometric-credit-debit-card>.

*Primary Examiner* — Daniel A Hess
(74) *Attorney, Agent, or Firm* — Lee Sullivan Shea & Smith LLP

(57) ABSTRACT

A smart payment card is provisioned with biometric data for an authorized card member and, for at least one financial account, (i) respective financial account information to be used for authorized card-present transactions and (ii) a respective set of virtual account numbers to be used for card-not-present transactions. The smart payment card is configured using a dongle and a user interface displayed at an end-user device. Processing a financial transaction involving a given financial account provisioned on the smart payment card involves authenticating a received biometric input, and if the authentication is successful, (i) transmitting identifying information for the given financial account to a point-of-sale device if the financial transaction is a card-present transaction, or (ii) presenting, at a display of the
(Continued)

smart payment card, a first virtual account number from a respective set of virtual account numbers for the given financial account if the transaction is a card-not-present transaction.

20 Claims, 9 Drawing Sheets

(51) Int. Cl.
   *G06K 19/077* (2006.01)
   *G06Q 20/32* (2012.01)
   *G06Q 20/34* (2012.01)
   *G06Q 20/40* (2012.01)
   *G06V 40/12* (2022.01)

(52) U.S. Cl.
   CPC ..... *G06Q 20/322* (2013.01); *G06Q 20/40145* (2013.01); *G06V 40/1365* (2022.01)

(58) Field of Classification Search
   USPC .......................................................... 705/16
   See application file for complete search history.

(56) References Cited

U.S. PATENT DOCUMENTS

| | | |
|---|---|---|
| 10,956,881 B2 | 3/2021 | Moskowitz et al. |
| 11,455,634 B2 | 9/2022 | Agrawal et al. |
| 12,093,925 B1 * | 9/2024 | Singla .................. G07F 7/0846 |
| 2002/0133467 A1 | 9/2002 | Hobson et al. |
| 2002/0163421 A1 | 11/2002 | Wang et al. |
| 2003/0028481 A1 | 2/2003 | Flitcroft et al. |
| 2007/0114274 A1 | 5/2007 | Gibbs et al. |
| 2009/0248581 A1 | 10/2009 | Brown |
| 2016/0189127 A1 | 6/2016 | Amarnath et al. |
| 2017/0289127 A1 | 10/2017 | Hendrick |
| 2021/0019741 A1 | 1/2021 | Kurani et al. |
| 2021/0073826 A1 | 3/2021 | Garrett et al. |

* cited by examiner

SMART PAYMENT CARD, AND COMPUTING SYSTEMS AND METHODS FOR CONFIGURING SMART PAYMENT CARD AND PROCESSING TRANSACTIONS INVOLVING SMART PAYMENT CARD

CROSS-REFERENCE TO RELATED APPLICATIONS

This application is a continuation of U.S. application Ser. No. 18/306,850, filed on Apr. 25, 2023, and titled "Smart Payment Card, and Computing Systems and Methods for Configuring Smart Payment Card and Processing Transactions Involving Smart Payment Card," the contents of which are incorporated by reference herein in their entirety.

BACKGROUND

For many consumers, payment cards (e.g., debit cards, credit cards, etc.) have become a preferred means of payment for financial transactions in lieu of cash or checks. Payment cards are easily transportable, are more convenient to carry instead of cash or a checkbook, and enable automated tracking of financial activity. However, payment cards remain susceptible to theft and fraud. As a result, business organizations that provide payment card services (e.g., payment card issuers, etc.) are increasingly seeking ways to enhance security measures and fraud protection for financial transactions involving payment cards.

OVERVIEW

In line with the discussion above, payment cards with enhanced security protections have been developed. One approach for payment card security involves using biometric verification to authenticate a card member and authorize a financial transaction. This approach involves equipping a payment card with a biometric sensor (e.g., a fingerprint sensor), storing an authorized card member's biometric data (e.g., the card member's fingerprint information), and checking for a biometric match during a transaction involving the payment card.

However, this approach presents several drawbacks and continues to expose payment cards to various security and fraud vulnerabilities. For example, existing payment cards that are equipped to receive biometric input typically use biometric verification only for card-present transactions (e.g., transactions where the payment card is physically presented to a merchant/point-of-sale terminal) and fail to enforce a similar level of protection for card-not-present (CNP) transactions (e.g., e-commerce transactions where the payment card is not physically presented to a merchant and the primary account number associated with the payment card is instead entered at the merchant's website or mobile application). For instance, while a card member may be required to provide a verified biometric input to authorize card-present transactions involving a payment card, no such requirement is enforced for CNP transactions. Thus, if a card member's payment card is lost or stolen, an unauthorized user can use the payment card to initiate fraudulent CNP transactions without being required to provide a verified biometric input to authorize the transaction.

Moreover, such fraudulent use of a lost or stolen payment card is facilitated by the propensity for existing payment cards to display identifying information for a card member and the card member's financial account, which can then be used by anyone with access to the payment card to complete financial transactions using the card member's financial account without the need to verify the card member's identity. For instance, existing payment cards typically include the following information visible on (e.g., printed on a surface of, displayed on a screen of, etc.) the payment card itself: (i) the card member's name, (ii) a primary account number (PAN) for a given financial account that is associated with the payment card (e.g., a credit card number, a debit card number, etc.), (iii) a verification code associated with the PAN, such as a Card Verification Value (CVV), and (iv) an expiration date for the PAN. Thus, any person that has access to such a payment card has access to information that enables CNP transactions using the financial account associated with the payment card.

Another approach for payment card security involves using a digital wallet that is stored on a card member's Near Field Communication (NFC)-enabled device, such as a smartphone. This approach involves downloading a digital wallet application (e.g., Apple Pay, Samsung Pay, Google Pay, etc.) on the smartphone and then storing PANs for payment cards in the application, typically in the form of virtual account numbers. During a transaction, the card member can then utilize the digital wallet by selecting a given payment card via the application and then placing the smartphone in close proximity to a merchant's point-of-sale terminal to complete the transaction (e.g., tap to pay, etc.). However, this approach also presents certain challenges. As one example, a card member that uses a digital wallet on their smartphone is typically required to activate a lock on the smartphone that can be unlocked using a password (e.g., biometric input, pin code, pattern input, etc.) in an attempt to prevent unauthorized access to the digital wallet. In this regard, the smartphone lock is applied to use of the smartphone itself rather than only the digital wallet, and the card member is thus required to enter the password each time they wish to access their smartphone, which can become inconvenient considering the frequency with which the average smartphone user accesses their smartphone. Smartphone users who prefer to keep their smartphones unlocked are thus typically unable to utilize digital wallets. As another example, while digital wallets can serve as a convenient means of payment for card-present transactions, they typically cannot be used for CNP transactions because the virtual payment card numbers stored in the digital wallet are typically not fully displayed to the card member. Thus, card members who use digital wallets for card-present transactions must typically follow standard procedures for CNP transactions, such as (i) recalling payment card information from memory, (ii) obtaining payment card information from a physical payment card, or (iii) utilizing a service for storing and auto-filling payment card information for online transactions (e.g., a password management service).

To address these and other challenges surrounding existing payment cards and existing approaches for authorizing payment card transactions, disclosed herein is a new smart payment card and techniques for configuring the disclosed smart payment card, provisioning the disclosed smart payment card with biometric data, virtual account numbers, and financial account information, and processing financial transactions involving the disclosed smart payment card.

Accordingly, in one aspect, disclosed herein is a smart payment card comprising at least a microcontroller, a wireless communication component, a biometric sensor, and a display component, wherein the smart payment card has been provisioned with (i) identifying information for at least one financial account associated with a card member, and (ii) a respective set of virtual account numbers corresponding to each financial account.

In another aspect, disclosed herein is a method carried out by a computing system that involves: (1) provisioning a smart payment card with (i) identifying information for at least one financial account associated with a card member, and (ii) a respective set of virtual account numbers corresponding to each financial account, (2) detecting, via a biometric sensor of a smart payment card, one or more biometric inputs collectively indicating a request to process a financial transaction using a given financial account that has been provisioned on the smart payment card, (3) performing an authentication of the one or more biometric inputs based on previously captured biometric data of the card member, and (4) based on a successful authentication of the one or more biometric inputs: (i) if the financial transaction is a card-present transaction, causing identifying information for the given financial account to be transmitted to a point-of-sale device; or (ii) if the transaction is a card-not-present transaction, causing a first virtual account number from the respective set of virtual account numbers corresponding to the given financial account to be presented via a display of the smart payment card.

In one embodiment, provisioning the smart payment card may comprise: (1) causing an end-user device associated with the card member to display a user interface for provisioning smart payment cards, (2) determining that the smart payment card has been communicatively coupled to the end-user device via a computing device, (3) capturing, via a biometric sensor of the smart payment card, the biometric data of the card member that is to be used to authenticate requests to process financial transactions, (4) causing the end-user device to display one or more financial accounts associated with the card member, (5) receiving, via the user interface displayed at the end-user device, an indication of at least one financial account that has been selected for provisioning on the smart payment card, (6) for each selected financial account, obtaining the respective set of virtual account numbers that are approved for card-not-present transactions, and (7) causing (i) identifying information for each selected financial account and (ii) the respective set of virtual account numbers for each selected financial account to be provisioned on the smart payment card via the computing device.

In some embodiments, the method may further involve: before causing the end-user device to display the user interface for provisioning the smart payment card: (1) receiving, from the end-user device, a request to access the user interface, the request including information identifying a user account associated with the card member, (2) performing an authentication of the user account based on the request, and (30 determining that the authentication of the user account was successful.

Further, in some embodiments, the method may further involve: before determining that the smart payment card has been communicatively coupled to the end-user device via the computing device: (1) determining that the computing device has been communicatively coupled to the end-user device, and (2) registering the computing device to a user account associated with the card member.

Further yet, in some embodiments, the biometric data may be stored in a memory of the smart payment card. Still further, in some embodiments, the biometric data may comprise fingerprint data provided by the card member, and the biometric input may comprise a fingerprint input.

In some embodiments, the method may further involve: (1) after performing the authentication of the biometric input, presenting, via a display of the smart payment card, two or more financial account options from which the given financial account may be selected, (2) receiving an indication of a selection of the given financial account.

Further, in some embodiments, the method may further involve determining that the financial transaction is a card-present transaction based on detecting a point-of-sale device within a threshold proximity of the smart payment card.

Further yet, in some embodiments, each virtual account number may be approved for a single use, and the method may further involve: (1) monitoring an amount of virtual account numbers in each set of virtual account numbers, (2) determining that an amount of virtual account numbers in a respective set of virtual account numbers for a particular financial account has fallen below a threshold amount, (3) obtaining one or more new virtual account numbers corresponding to the particular financial account that are approved for card-not-present transactions, and (4) updating the respective set of virtual account numbers for the particular financial account to include the one or more new virtual account numbers.

Still further, in some embodiments, each virtual account number may be approved for a single use, and the method may further involve: (1) receiving a request to authorize a card-not-present financial transaction using a given virtual account number, (2) determining that the given virtual account number was already used in a previous card-not-present financial transaction, (3) denying the request.

In yet another aspect, disclosed herein is a computing system that includes at least one network interface, at least one processor, at least one non-transitory computer-readable medium, and program instructions stored on the at least one non-transitory computer-readable medium that are executable by the at least one processor such that the computing system is configured to carry out one or more of the functions disclosed herein, including but not limited to the functions of the foregoing methods.

Further, in another aspect, disclosed herein is at least one non-transitory computer-readable medium, wherein the at least one non-transitory computer-readable medium is provisioned with program instructions that, when executed by at least one processor, cause a computing platform to carry out one or more of the functions disclosed herein, including but not limited to the functions of the foregoing methods.

One of ordinary skill in the art will appreciate these as well as numerous other aspects in reading the following disclosure.

Figure 1A:
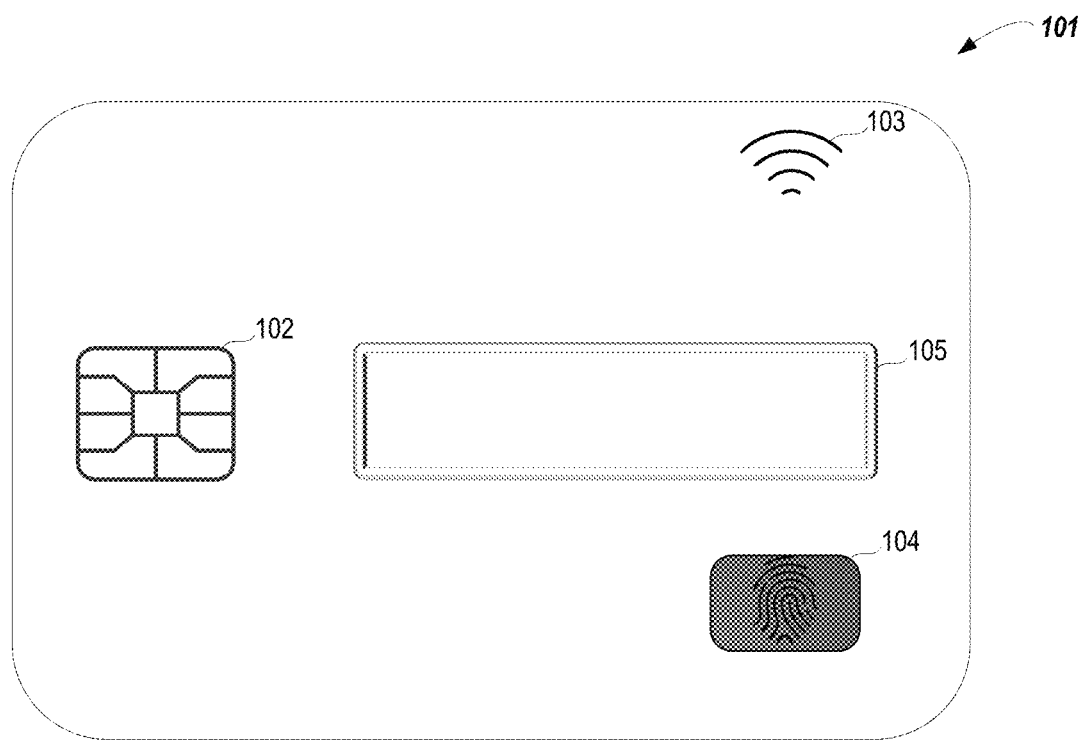
FIG. 1A depicts a simplified diagram of a front view of an example smart payment card in accordance with one embodiment of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As mentioned above, in one aspect, disclosed herein is a new smart payment card and new techniques for configuring the disclosed smart payment card, provisioning the disclosed smart payment card with cardmember biometric data and information corresponding to one or more financial accounts, and authorizing financial transactions involving the disclosed smart payment card. The disclosed smart payment card may also be referred to herein as a smart wallet, a smart deck, or a smart slate. The disclosed smart payment card may be configured to store (i) biometric information for at least one authorized card member, (ii) respective payment account numbers (PANs) for one or more financial accounts, and (iii) a set of virtual PANs for each financial account.

In another aspect, disclosed herein are new techniques for using the disclosed smart payment card to conduct financial transactions, which may involve (i) configuring the smart payment card, (ii) provisioning the smart payment card with card member biometric data for authenticating the card member's identity, and (iii) provisioning the smart payment card with information corresponding to one or more financial accounts.

In yet another aspect, disclosed herein are new techniques for authorizing financial transactions that are conducted using the disclosed smart payment card, which may involve (i) detecting a biometric input via a sensor of the smart payment card, (ii) authenticating the biometric input based on biometric information stored at the smart payment card, (iii) determining whether a financial transaction is a card-present or card-not-present transaction, and (iv) if the transaction is a card-present transaction, transmitting financial account information to a point-of-sale device, or if the transaction is a card-not-present transaction, displaying a virtual account number at the smart payment card.

Each of these aspects will be described in further detail below.

a. Example Smart Payment Card

FIG. 1A depicts a view of an example front outer surface of an example smart payment card 101 in accordance with one embodiment of the disclosed technology. In the example of FIG. 1A, the smart payment card is shown to resemble the shape and size of a physical payment card (e.g., credit card, debit card, etc.), such that it may be used in many of the same applications that other physical payment cards are used (e.g., inserted into a card reader device, etc.). However, it should be understood that the smart payment card may take other forms as well. The example smart payment card may include various physical components as described below, some of which are shown in the example of FIG. 1A. Further, as will be explained in more detail below, depending on the implementation, certain physical components of the example smart payment card may be exposed through the outer surface such that they are visible and/or accessible to a card member (e.g., microcontroller, biometric sensor, etc.), while certain other physical components of the example smart payment card may be completely or partially concealed by the outer surface (e.g., battery, NFC chip, etc.). Further yet, for certain physical components that may be concealed, the outer surface of the example smart payment card may comprise visual indicators indicating the presence of the certain physical components that serve to inform the card member of functionality that is made available by the concealed physical components (e.g., NFC chip for tap-to-pay functionality, etc.).

As one possibility, the example smart payment card 101 may comprise a microcontroller, which is shown in FIG. 1A as a microcontroller 102. The microcontroller 102 may take various forms, such as an integrated circuit, among other possibilities. Further, the microcontroller 102 may include various components. As one example, the microcontroller 102 may include one or more processing components that are configured to perform various functions, including performing biometric verification and communicating with other computing devices such as a smart card dongle or a point-of-sale terminal, among other functions which will be described in more detail further below. As another example, the microcontroller 102 may include one or more memory components that include a non-volatile memory component for storing data on the smart payment card (e.g., biometric data, financial account data, etc.) and a non-volatile memory component for storing processing logic that is used for executing one or more of the functions described herein. As yet another example, the microcontroller 102 may include a set of pins that facilitate the communication between the microcontroller 102 and other computing components. The microcontroller 102 may include any number of pins (e.g., seven pins, eight pins, twelve pins, etc.) that may be needed to facilitate microcontroller functionality.

Further, as another example, the microcontroller 102 may comprise a capacitor that serves to supply power to the various components of the smart payment card 101 for performing one or more of the functions described herein, such as executing processing logic or broadcasting a signal for detecting nearby devices, which will be explained in more detail further below. The capacitor may source power from external sources, such as an external battery or a battery-powered computing device that the smart payment card 101 can directly or indirectly connect to, such as a card reader or a smartphone. In some implementations, the smart payment card 101 may alternatively or additionally comprise a battery component that serves to receive and supply power to the various components of the smart payment card 101. Such a battery component may take any of various forms now known or later discovered, including an embedded rechargeable battery, such as a solar strip or cell, among other possibilities. In some implementations, the smart payment card 101 may be capable of inductive charging and may be able to self-charge.

As shown in FIG. 1A, the microcontroller 102 may be exposed through the outer surface of the smart payment card 101, thus enabling the microcontroller 102 to be used for purposes such as communicating with other computing devices. For instance, the portion of the smart payment card 101 comprising the microcontroller 102 may be coupled with a computing device comprising a chip reader to exchange information.

The microcontroller 102 may include other components as well.

As another possibility, the example smart payment card 101 may be equipped with a wireless communication component 103 that enables the smart payment card 101 to communicate wirelessly with other devices. The wireless communication component 103 may take various forms. As one example, the wireless communication component 103 may comprise a chip that enables the smart payment card 101 to communicate using a short-range wireless communication protocol (e.g., radio frequency identification (RFID), near-field communication (NFC), etc.) with other similarly-enabled computing devices. For example, the wireless communication component 103 may enable the smart payment card 101 to communicate with a card member's smartphone by broadcasting wireless signals to determine whether the smartphone is within a threshold proximity of the smart payment card, which may in turn impact transaction authorization, as will be explained further below. As another example, the wireless communication component 103 may enable the smart payment card 101 to communicate with a card reader at a point-of-sale terminal to determine that a transaction is a card-present transaction and/or to authorize a transaction. Other examples are also possible. In the example shown in FIG. 1A, the actual wireless communication component 103 may be concealed by the outer surface of the smart payment card 101, and an indicator of the wireless communication component 103— e.g., an icon indicating wireless communication functionality—may be depicted on the outer surface of the smart payment card 101 to indicate that the smart payment card 101 is capable of wireless communication.

As yet another possibility, the example smart payment card 101 may include a biometric sensor 104 that serves to receive biometric input from a card member. In the example shown in FIG. 1, the biometric sensor 104 comprises a fingerprint reader that is capable of receiving fingerprint data. However, it should be understood that the biometric sensor 104 may take other forms as well, such as a facial scanner or a retinal scanner, among other possibilities, or may take the form of a combination of different components that serve to receive biometric input. In some implementations, the biometric sensor 104 may be configured to receive other types of inputs from a card member (e.g., input selections) in addition to receiving biometric data. For example, the biometric sensor 104 may be configured to operate in parallel with a display 105 to enable the card member to indicate a selection of a given financial account that is to be used for a financial transaction, where a set of possible financial accounts may be presented via the display 105. As another example, the biometric sensor 104 may be configured to receive an input that causes the display 105 to present virtual financial account information that is to be used for a CNP transaction. In such implementations, the biometric sensor 104 may be configured to recognize various inputs and/or input patterns (e.g., short taps, long taps, swipes, etc.) that correspond to given commands for selecting and/or navigating information that is presented via the display 105. For example, as one possibility, the biometric sensor 104 may be configured to recognize (i) a first tap input provided for a first amount of time (e.g., 2 seconds) as a command to present via the display 105 a set of financial account identifiers (e.g., financial account nicknames) corresponding to respective financial accounts that have been provisioned on the smart payment card 101, (ii) a swipe input as a command to navigate between account identifiers (e.g., swipe left or right to cause the display 105 to present a different account identifier, and (iii) a second tap input provided for a second amount of time (e.g., 3 seconds) as a command to select a respective financial account corresponding to a given financial account identifier that is to be used for a financial transaction. Many other examples are possible. As shown in FIG. 1A, the biometric sensor 104 may be exposed through the outer surface of the smart payment card 101, thus enabling the biometric sensor 104 to be used by the card member in line with the discussion above.

Further, as another possibility, the example smart payment card 101 may include a display component, which may take various forms. In the example of FIG. 1, the display 105 may comprise a thin display for presenting information, such as financial account proxy information, or virtual financial account information, among other possibilities. Notably, in some implementations, the display 105 may be configured such that it remains in a default idle state and becomes active (perhaps only for a given amount of time) after a verified biometric input has been provided, thus reducing the likelihood that an unauthorized user could gain access to a card member's personal identifying information or financial account information via the smart payment card 101. In this regard, the smart payment card 101 may be configured (e.g., the microcontroller 102 of the smart payment card 101 may be provisioned with processing logic) to determine whether or not a financial transaction is a card-not-present transaction or a card-present transaction, and then based on that determination, determine what information is to be presented via the display 105. For example, as one possibility, after successfully verifying a biometric input provided via the biometric sensor 104 at the time of a transaction, the smart payment card 101 may determine that the transaction is a card-present transaction—perhaps by detecting (e.g., via the wireless communication component 103) that a card reader device is within a threshold proximity of the smart payment card 101. Based on determining that the transaction is a card-present transaction, the smart payment card 101 may either (i) transmit to the card reader device financial account information corresponding to a financial account stored on the smart payment card 101 in order to process the transaction, or (ii) if the smart payment card 101 has been provisioned with more than one financial account, present via the display 105 a set of financial account options from which the card member may select a given financial account that is to be used for the transaction, and then transmit to the card reader device financial account information corresponding to the given financial account in order to process the transaction. As shown in FIG. 1A, the display 105 may be exposed through the outer surface of the smart payment card 101.

As another possibility, after successfully verifying a biometric input provided via the biometric sensor 104 at the time of a transaction, the smart payment card 101 may determine that the transaction is a card-not-present transaction—perhaps by detecting (e.g., via the wireless communication component 103) that no card reader device is within a threshold proximity of the smart payment card 101. Based on determining that the transaction is a card-not-present transaction, the smart payment card 101 may either (i) cause the display 105 to present a pre-approved virtual account number (and perhaps also supplemental information such as an expiration date and/or a CVV) corresponding to a financial account stored on the smart payment card 101, or (ii) if the smart payment card 101 has been provisioned with more than one financial account, cause the display 105 to present a set of financial account options from which the card member may select a given financial account that is to be used for the transaction, and then present a pre-approved virtual account number (and perhaps also supplemental information such as an expiration date and/or a CVV) corresponding to the given financial account. The card member may then use the virtual account number presented via the display 105 to complete the transaction. For instance, the card member may enter the virtual account number displayed by the smart payment card 101 at a merchant's website or mobile application.

In some implementations, the example smart payment card 101 may include a selector element (not shown in FIG. 1A) that can be used to navigate through and/or select options presented via the display 105. The selector element may take various forms. For example, as one possibility, the selector element may comprise a first button for navigating information presented via the display 105 and a second button for making a selection. Other examples are also possible.

Figure 1B:
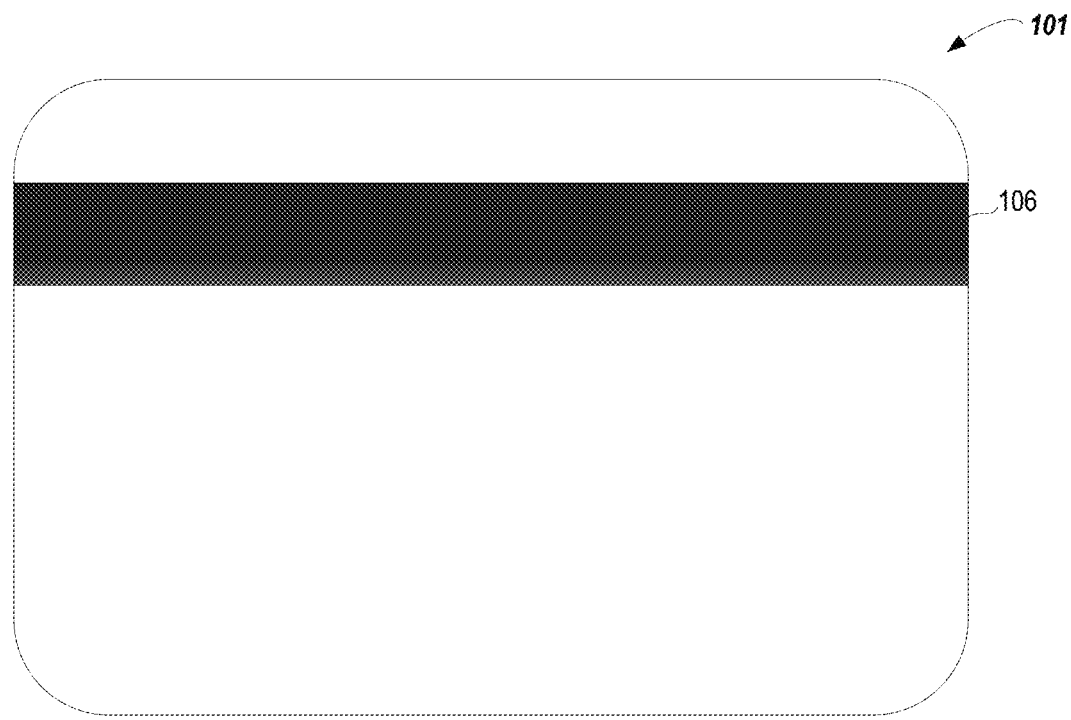
FIG. 1B depicts a simplified diagram of a rear view of an example smart payment card in accordance with one embodiment of the disclosed technology.

In some implementations, the example smart payment card 101 may include a magnetic stripe that serves to communicate with another computing device. FIG. 1B depicts a view of an example rear outer surface of the example smart payment card 101 in such an implementation. As shown in FIG. 1B, the example smart payment card 101 may include a magnetic stripe 106 that facilitates communication with another computing device. For instance, as one possibility, the magnetic stripe 106 may be swiped at a card reader to transmit information for authorizing a transaction. As another possibility, the magnetic stripe 106 may be swiped or coupled with a dongle to facilitate provisioning the smart payment card 101 with biometric data and/or financial account information, as will be explained in more detail further below.

Figure 1C:
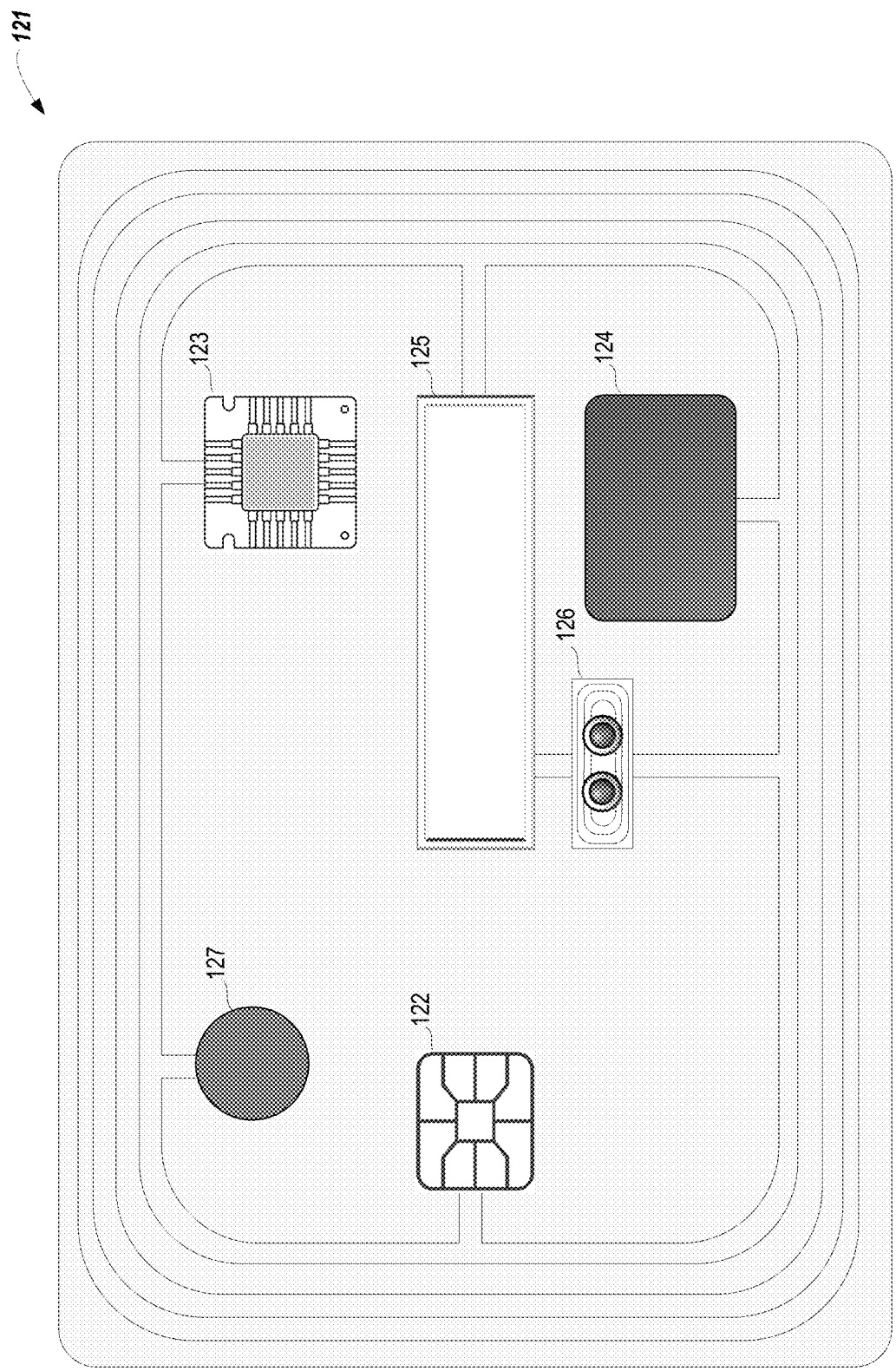
FIG. 1C depicts a simplified diagram of an internal view of an example smart payment card in accordance with another embodiment of the disclosed technology.

The example smart payment card 101 may take other forms and may include other components as well. Turning now to FIG. 1C, an internal view of an example layout of physical components of an example smart payment card 121 in accordance with one embodiment of the disclosed technology is shown. The smart payment card 121 may resemble the smart payment card 101 of FIGS. 1A and 1B. As shown in FIG. 1C, the smart payment card 121 may comprise circuitry that connects and facilitates interaction between the various physical components of the smart payment card 101. For instance, the smart payment card 121 may comprise a microcontroller 122 that is connected to other physical components of the smart payment card 121 to facilitate various functionality in line with the discussion above and as disclosed herein, such as providing power to and/or communicating with one or more of the other physical components. Like the smart payment card 101, the smart payment card 121 may also comprise a wireless communication component 123 (e.g., an NFC chip, etc.), a biometric sensor 124 (e.g., a fingerprint reader, etc.), and a display 125. Additionally, in the example shown in FIG. 1C, the smart payment card 121 may comprise a selector element 126 comprise two buttons that can be used by a card member to interact with information presented via the display 125. Furthermore, the smart payment card 121 may comprise a battery component 127 that serves to receive and supply power to the various components of the smart payment card 121.

Figure 1D:
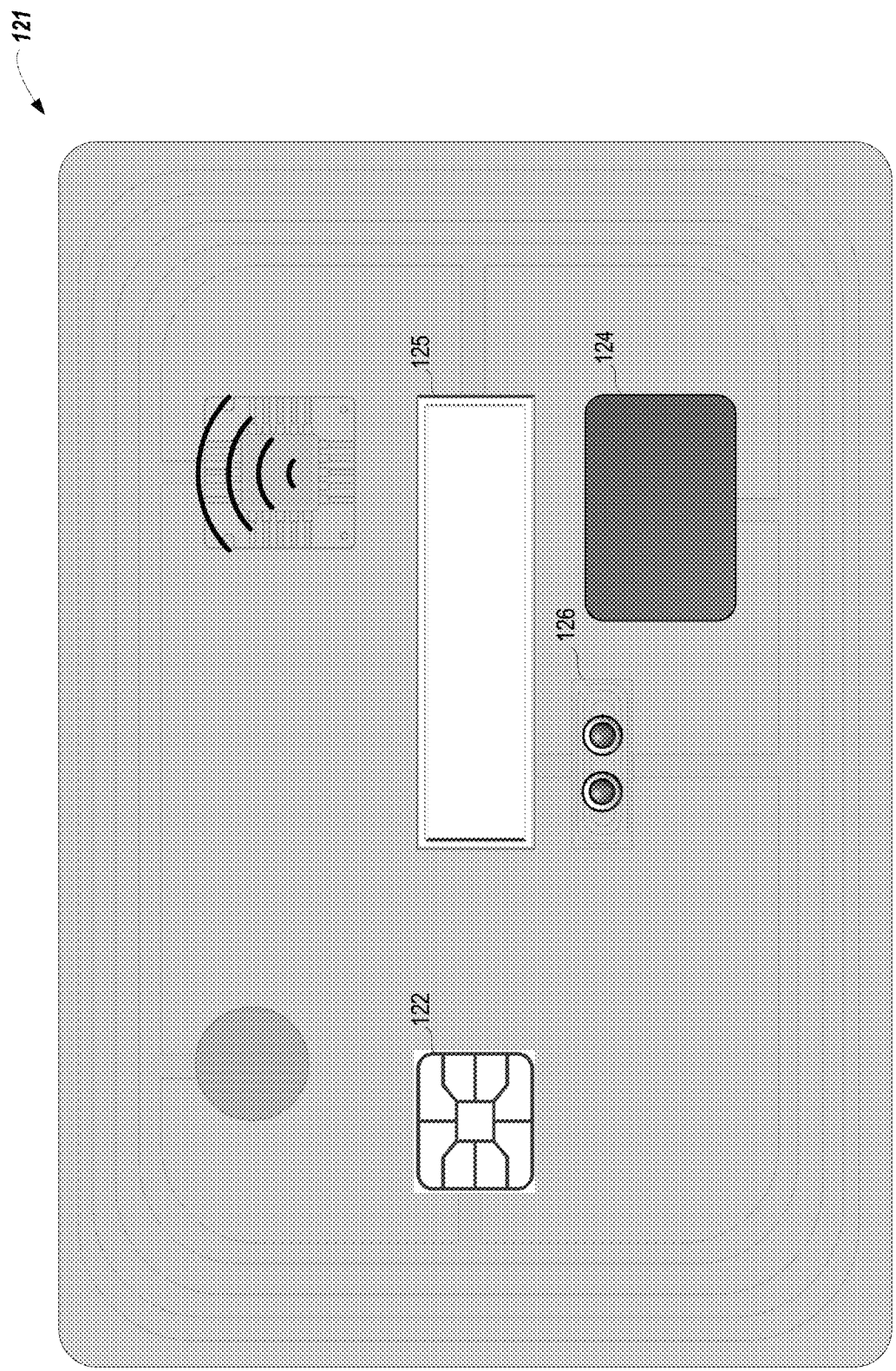
FIG. 1D depicts a simplified diagram of a front view of the example smart payment card of FIG. 1C.

In line with the discussion above, certain of the physical components 122-127 may be exposed when the smart payment card 121 is fitted with an outer surface, such that they are accessible to a card member, while other physical components may be at least partially concealed. For instance, FIG. 1D depicts the smart payment card 121 after it has been fitted with an outer surface. As shown in FIG. 1D, the microcontroller 122, the biometric sensor 124, the display 125, and the buttons of the selector element 126 may be exposed so that the card member can interact with them as disclosed herein. However, in line with the discussion above, the wireless communication component 123 may be concealed by the outer surface of the smart payment card 121 and may be indicated by an icon indicating that the smart payment card 121 is capable of wireless communication. Further, in the example of FIG. 1D, the battery component 127 may also be concealed by the outer surface. In other examples, such as where the battery component 127 is a solar battery, the battery component 127 may be exposed through the outer surface of the smart payment card 121. Other examples are also possible.

b. Example Computing Environment

As mentioned above, the disclosed smart payment card may communicate with one or more other computing devices to facilitate the techniques disclosed herein, including techniques related to (i) configuring a smart payment card, (ii) provisioning a smart payment card with biometric information, (iii) provisioning a smart payment card with financial account information, or (iv) processing financial transactions.

Figure 2:
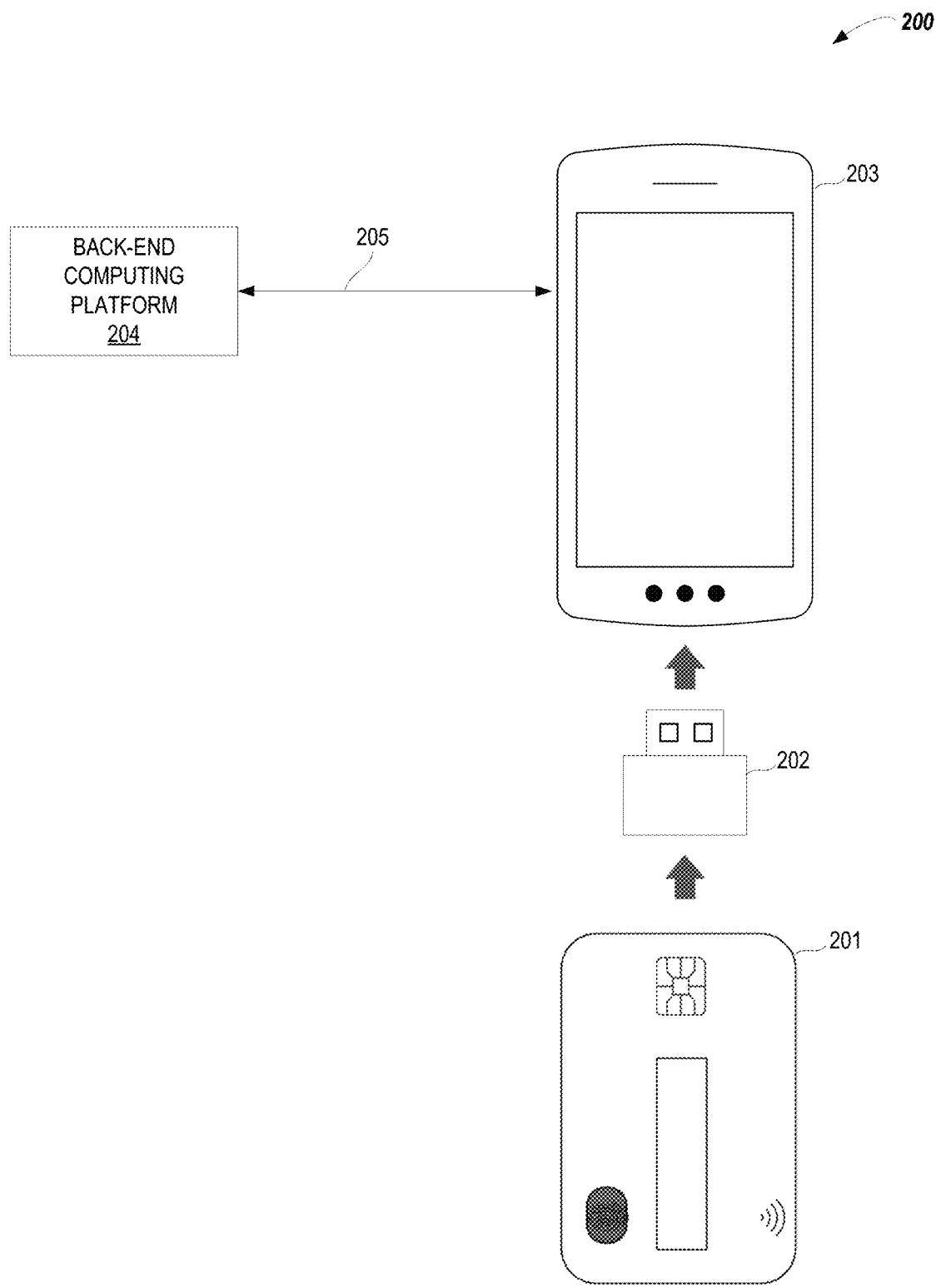
FIG. 2 depicts one embodiment of an example computing environment including an example smart payment card in accordance with the disclosed technology.

One example of a computing environment comprising the disclosed smart payment card and other computing devices with which the disclosed smart payment card may communicate is shown in FIG. 2. As shown in FIG. 2, an example computing environment 200 may include (i) a smart payment card 201, (ii) a computing device 202, (iii) an end-user device 203, and (iv) a back-end computing platform 204.

The smart payment card 201 may resemble the example smart payment card 101 discussed above with reference to FIG. 1A-1B. For instance, the smart payment card 201 may comprise a microcontroller, a biometric sensor, a wireless communication component, a display component, and/or a magnetic stripe.

The computing device 202—which may also be referred to herein as a dongle 202—may enable communication between the smart payment card 201 and other computing devices, such as an end-user device associated with a card member (e.g., a smartphone, a tablet, a computer, etc.) and/or one or more remote computing devices, such as a back-end computing platform that is configured to run the disclosed software technology for configuring the smart payment card 201. The dongle 202 may serve as an intermediary device that enables the smart payment card 201 to be indirectly coupled with the end-user device 203 and receive information via the end-user device 203 from the back-end computing platform 204. In some examples, as shown in FIG. 2, the dongle 202 may be communicatively coupled to (e.g., plugged into a port of) the end-user device 203 at a first end of the dongle 202 and communicatively coupled to the smart payment card 201 at a second end of the dongle 202. For instance, a microcontroller or a magnetic stripe of the smart payment card 201 may be inserted at the second end of the dongle 202. When coupled with both the end-user device 203 and the smart payment card 201, the dongle 202 may serve to relay communications and/or information to the smart payment card 201.

The end-user device 203 may be a computing device that is associated with a card member who is approved to use the smart payment card 201. The end-user device 203 may take various forms, including a smartphone (as shown in FIG. 2), a tablet, or a laptop computer, among other possibilities. As will be described below, the end-user device 203 may be used along with the dongle 202 to configure the smart payment card 201.

The back-end computing platform 204 may be a computing platform operated by a business organization (e.g., a financial institution) that is responsible for managing the card member's financial accounts and/or for issuing the smart payment card 201. The back-end computing platform 204 may be configured to facilitate one or more of the techniques disclosed herein. For instance, the back-end computing platform 204 may be configured to run software technology (e.g., in the form of one or more software applications such as a web application, a mobile application, a desktop application, among other possibilities) that facilitates one or more of the techniques disclosed herein, and may communicate with the end-user device 203 via a data network 205 in connection with executing one or more of the techniques disclosed herein.

c. Configuring a Smart Payment Card

As mentioned above, the various computing devices of the computing environment 200 shown in FIG. 2 may coordinate with one another to facilitate various techniques disclosed herein related to configuring the smart payment card 201, including provisioning the smart payment card 201 with financial account information and biometric data that is to be used for authorizing and processing financial transactions involving the smart payment card 201.

Figure 3:
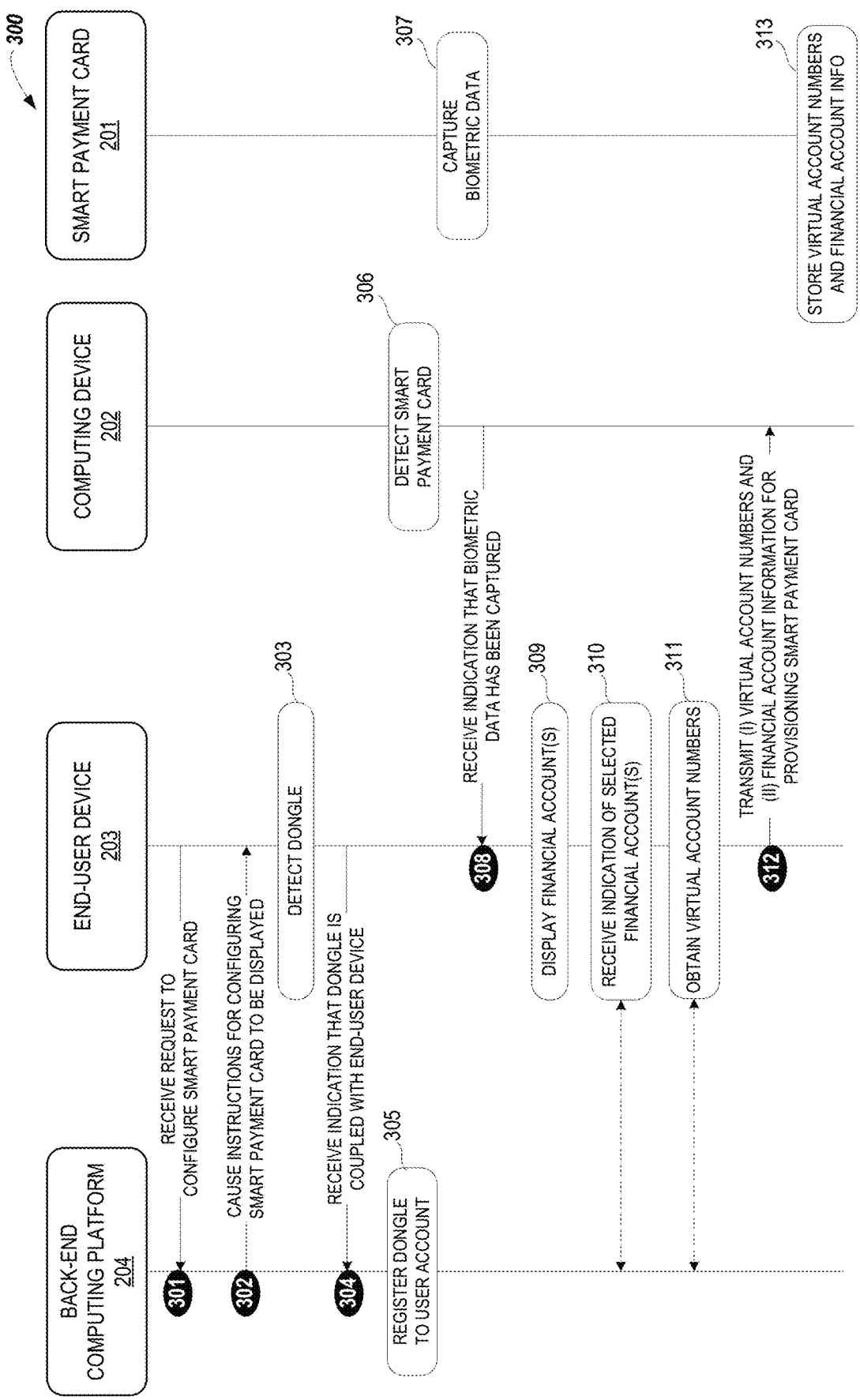
FIG. 3 depicts one embodiment of an example process for configuring a smart payment card in accordance with the disclosed technology.

Turning now to FIG. 3, a flow diagram of an example process 300 for configuring a smart payment card described above with reference to FIG. 2 is shown. The example process 300 may include one or more operations, functions, or actions as illustrated by one or more of steps 301-313. Although steps 301-313 are illustrated in sequential order, these steps may also be performed in parallel, and/or in a different order than those described herein. Also, the various steps may be combined into fewer steps, divided into additional steps, and/or removed based upon the desired implementation. Furthermore, in the examples below while the steps 301-313 may be described as being performed by a certain computing device depicted in FIG. 3, it is possible that depending on the implementation, any one or more of the steps 301-313 may be performed by a different computing device depicted in FIG. 3, or may be split amongst one or more of the computing devices shown in FIG. 3.

In addition, for the example process 300, the flow diagram shows functionality and operation of one possible implementation of embodiments described herein. In this regard, each step may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the example process 300, each step shown in FIG. 3 may represent circuitry that is wired to perform the specific logical functions in the process.

The example process 300 includes operations that may be carried out in relation to configuring a smart payment card, including registering a dongle to a card member, provisioning a smart payment card with biometric information, and provisioning a smart payment card with financial account information.

In practice, the smart payment card 201 shown in FIG. 3 may be provided to a customer (also referred to herein as a card member) of a financial institution. For instance, the financial institution may determine that the card member is approved to receive a smart payment card and may provide (e.g., mail to, make available for in-branch pickup, etc.) the card member with a smart payment card package that may include the smart payment card 201, the dongle 202, and perhaps also written instructions for configuring the smart payment card 201. Initially, the smart payment card 201 may be in an unconfigured state—i.e., unassociated with any customer or any financial account and devoid of any stored biometric information. After being provided to the card member, the card member may then configure the smart payment card 201 for use.

Advantageously, providing the disclosed smart payment card to a customer in an unconfigured state enables the financial institution responsible for issuing the smart payment card to conserve resources that would otherwise be expended under the existing approaches for issuing payment cards, which typically require each payment card to be pre-associated with a given financial account of a given customer and printed with identifying information for the given financial account and the given customer. Further, providing customers with a "blank slate" smart payment card as discussed herein not only alleviates preparation and processing burdens on behalf of the financial institution, but also enables the smart payment cards to be configured in accordance with customer preferences, as will be explained below.

The process for configuring the smart payment card 201 may take various forms. In one implementation, the process for configuring the smart payment card 201 may involve a dongle and a user interface presented at an end-user device associated with the card member, such as the end-user device 203 shown in FIG. 2. For instance, the card member may access, via the end-user device 203, a software application (e.g., a web application, a mobile application) hosted by the back-end computing platform 204 that is operated by the financial institution responsible for issuing the smart payment card 201. For instance, the software application may be a banking application provided by the financial institution that the card member may access to perform various actions related to the card member's financial accounts, such as obtaining account balance information, making payments, transferring balances, among other possibilities. In this regard, in some instances, the card member may have an existing, previously registered user account with the financial institution and may log in to the banking application via the existing user account. In other instances, such as where the card member is a new customer of the financial institution, the card member may be required to register a new user account with the financial institution. In any event, the card member may be required to provide login credentials for the card member's user account in order to access the user interface via the software application. Based on the login credentials provided by the card member, the back-end computing platform 204 may authenticate the card member (e.g., verify the card member's identity). If the authentication is successful, the back-end computing platform 204 may provide the card member with access to the user interface, whereby the card member may navigate to one or more user interface views for configuring a smart payment card and initiate the process for configuring the smart payment card 201.

FIG. 3 depicts a flow diagram of one example process for configuring a smart payment card in accordance with the disclosed technology. The diagram shown in FIG. 3 depicts an example process 300 that may involve the smart payment card 201, the computing device 202 (e.g., the dongle 202), the end-user device 203 (e.g., a smartphone, tablet, or computer associated with the card member), and the back-end computing platform 204. For illustrative purposes, the example process 300 will be described below with respect to performing an initial configuration of a smart payment card, but it should be understood that one or more of the steps 301-313 described with reference to FIG. 3 may be repeated to re-configure a smart payment card after initial configuration is complete.

In practice, the example process 300 may be initiated by the card member navigating to the one or more user interface views for configuring a smart payment card and inputting a request to configure a smart payment card (e.g., selecting an option to configure a smart payment card). In response to the card member's selection, the end-user device 203 may communicate an indication of the request to the back-end computing platform 204. At step 301, the back-end computing platform 204 may receive the indication of the request to configure the smart payment card. In turn, at step 302, the back-end computing platform 204 may cause the end-user device 203 to display instructions for one or more actions that may be required to configure the smart payment card 201. For example, as mentioned above, the back-end computing platform 204 may interact with the smart payment card 201 via the end-user device 203 and the dongle 202, and the instructions may thus involve guiding the card member through the processes of physically coupling the end-user device 203, the dongle 202, and the smart payment card 201. For instance, the back-end computing platform 204 may cause the end-user device 203 to display instructions directing the card member to connect the dongle 202 to the end-user device 203 by inserting a connector of the dongle 202 into a port of the end-user device 203. At step 303, the end-user device 203 may detect that the dongle 202 has been connected and may transmit an indication to the back-end computing platform 204 that the end-user device 203 and the dongle 202 are coupled.

At step 304, the back-end computing platform 204 may receive the indication that the dongle 202 has been coupled with the end-user device 203. At step 305, the back-end computing platform 204 may optionally register the dongle 202 to the card member. For instance, the indication that the dongle 202 has been coupled with the end-user device 203 may include an identifier of the dongle 202 (e.g., a serial number), and the back-end computing platform 204 may register the dongle 202 to the card member by causing the identifier of the dongle 202 to be associated with the card member's user account. After the dongle 202 has been registered to the card member's user account, the dongle 202 may be used to configure the smart payment card 201 in various ways, including provisioning the smart payment card 201 with biometric and financial account information and configuring other behaviors of the smart payment card 201.

After the dongle 202 has been coupled to the end-user device 203, the back-end computing platform 204 may cause the end-user device 203 to display further instructions (or to continue displaying instructions) for configuring the smart payment card 201. For instance, the back-end computing platform 204 may cause the end-user device 203 to display instructions directing the card member to connect the smart payment card 201 to the dongle 202, which may involve, for example, inserting a portion of the smart payment card 201 (e.g., a portion comprising the microcontroller or the magnetic stripe of the smart payment card 201) into a receiving area of the dongle 202 that is configured to couple with the microcontroller or the magnetic stripe of the smart payment card 201. At step 306, the dongle 202 may detect that the smart payment card 201 has been successfully coupled. In turn, the dongle 202 may transmit an indication to the end-user device 203 that the smart payment card 201 has been successfully coupled. In some implementations, one or both of the end-user device 203 or the dongle 202 may provide an audio and/or visual indication when the smart payment card 201 has been successfully coupled to the dongle 202. For instance, the dongle 202 may present a visual indication (e.g., a light indicator, a message on a display, etc.) and/or an audio indication (e.g., an alert) upon detecting a successful (or unsuccessful) connection with the smart payment card 201. Additionally or alternatively, the end-user device 203 may present a visual and/or audio indication via the user interface when the smart payment card 201 has been successfully coupled with the dongle 202.

After receiving the indication that the smart payment card 201 has been successfully coupled to the dongle 202, the end-user device 203 may take various actions. For instance, as one possibility, the end-user device 203 may transmit an instruction via the dongle 202 for the smart payment card 201 to capture biometric data via the biometric sensor. Further, the end-user device 203 may display an instruction for the card member to provide, via the biometric sensor of the smart payment card 201, biometric data that will be used for operating the smart payment card 201. For instance, the instructions may direct the card member to provide one or more biometric inputs via the biometric sensor of the smart payment card 201. In this regard, the end-user device 203 and the smart payment card 201 may communicate via the dongle 202 to obtain biometric data. For instance, if the biometric data comprises fingerprint data, the smart payment card 201 may attempt to detect fingerprint data via its biometric sensor and may provide indications to the dongle 202 regarding whether or not fingerprint data has successful been captured. In turn, the dongle 202 may relay such indications to the end-user device 203, which may cause the end-user device 203 to display updated instructions to further guide the card member in providing an acceptable fingerprint (e.g., adjust a position for providing fingerprint data, provide fingerprint data for a longer period of time, etc.) or display a confirmation if fingerprint data has been successfully captured. In some implementations, the card member may be able to provide a plurality of fingerprint data (e.g., fingerprint data for more than one finger, fingerprint data for more than one card member) that may be used to operate the smart payment card 201. In such implementations, the smart payment card 201 may undergo various iterations of capturing and storing fingerprint data.

At step 307, the smart payment card 201 may determine that biometric data (e.g., fingerprint data) has been successfully captured. In line with the discussion above, the biometric data may be stored locally in a memory of the smart payment card 201 without being transferred over a data network to any other computing device, such as the end-user device 203 or the back-end computing platform 204, thereby reducing the likelihood of unauthorized access to/release of the card member's biometric data. Furthermore, because the biometric data that is captured and stored at the smart payment card 201 may be used to operate the smart payment card 201, such as to activate a display of the smart payment card 201 or to authorize a financial transaction involving the smart payment card 201, the likelihood that a user other than the card member could access and utilize the smart payment card 201 after it has been configured by the card member is significantly reduced.

At step 308, the end-user device 203 may receive an indication via the dongle 202 that the smart payment card 201 has successfully captured the card member's biometric data. In turn, at step 309, the end-user device 203 may present one or more user interface views that enable the card member to select one or more financial accounts of the card member that are to be provisioned on the smart payment card 201. For instance, the user interface view(s) may present an identifier (e.g., a portion of a PAN) for each financial account of the card member that may be provisioned on the smart payment card 201, and the card member may provide a respective input selecting each financial account that should be provisioned on the smart payment card 201. The user interface view(s) may further enable the card member to provide a respective proxy identifier for each selected financial account. For instance, the card member may be able to input, via the user interface presented at the end-user device 203, a nickname for each selected financial account (e.g., "Credit Card 1," "Debit Card," etc.) that serves to identify the financial account while masking sensitive information, such as the PAN of the financial account. Notably, only the proxy identifier of a financial account may be used by the smart payment card 201 when displaying financial account information via a display of the smart payment card 201. In combination with requiring a biometric verification to activate the smart payment card 201 as described above, displaying only the proxy identifiers for financial accounts loaded on the smart payment card 201 advantageously provides an additional layer of protection against fraudulent use of the card member's financial account information. For example, even if an unauthorized user is able to view financial account information that is displayed by the smart payment card 201, the unauthorized user would obtain only a proxy identifier for the financial account and would be unable to extract any information that could lead to an unauthorized use for the financial account.

At step 310, based on the card member selecting one or more financial accounts that are to be provisioned on the smart payment card 201, the end-user device 203 may receive an indication of each selected financial account. In turn, at step 311, for each financial account that was selected, the end-user device 203 may obtain a set of virtual account numbers that are each approved for a one-time use for a card-not-present transaction. Obtaining the set of virtual account numbers may take various forms. In one implementation, the end-user device 203 may transmit, to the back-end computing platform 204, the indication of each financial account that has been selected for provisioning on the smart payment card 201. In turn, the back-end computing platform 204 may generate the virtual account numbers and transmit them to the end-user device 203. In another implementation, the end-user device 203 may generate the virtual account numbers (e.g., via a mobile application) and then provide an indication of the virtual account numbers to the back-end computing platform 204. In yet another implementation, the end-user device 203 may instruct the smart payment card 201 to generate the virtual account numbers. Other examples are also possible.

The set of virtual account numbers may comprise any combination of numbers (e.g., 10 numbers, 15 numbers, etc.) that may be stored in a memory of the smart payment card 201. Further, usage of each virtual account number may be tracked such that if the amount of virtual account numbers in a given set falls below a threshold amount (e.g., three, five, etc.), the end-user device 203 may display a notification that a set of virtual account numbers for a given financial account is nearing depletion. The card member may then provision the smart payment card 201 with new virtual account numbers using the dongle 202 and the user interface presented at the end-user device 203 as described above. In one implementation, the back-end computing platform 204 may be responsible for tracking usage of the virtual account numbers and transmitting an indication to the end-user device 203 if a set of virtual account numbers requires replenishing. In other implementations, a different device, such as the end-user device 203, or a remote computing device associated with the financial institution, may be responsible for tracking usage of the virtual account numbers.

Tracking the usage of each virtual account number may also enable identification of unauthorized transactions. For instance, in an implementation where the back-end computing platform 204 is responsible for tracking usage, if the back-end computing platform 204 receives a request from a merchant to authorize a card-not-present transaction using a given virtual account number that was already used for a previous card-not-present transaction, the back-end computing platform 204 may determine that the request is unauthorized. In turn, the back-end computing platform 204 may cause the card-not-present transaction to be denied and may further cause the card member to be notified regarding an unauthorized transaction attempt and/or to be provided with recommended actions that should be taken by the card member to protect the smart payment card 201.

At step 312, the end-user device 203 may cause, for each financial account that is to be provisioned to the smart payment card 201, the associated information to be provided to the smart payment card 201. In line with the discussion above, this information may include (i) financial account information—which may include identifying information (e.g., a PAN, an expiration date, a CVV, etc.) that is to be used for card-present transactions, (ii) virtual account numbers corresponding to each financial account, and (iii) a proxy identifier that is to be displayed at the smart payment card 201 for each financial account. For instance, the end-user device 203 may relay the information to the smart payment card 201 via the dongle 202. At step 313, the smart payment card 201 may store the (i) financial account information, (ii) virtual account numbers, and (iii) proxy identifier for each financial account. Optionally, after this information is stored, the smart payment card 201 may provide an indication via the dongle 202 that provisioning of the selected financial accounts is complete, and the end-user device 203 may display a notification indicating that the smart payment card 201 has been provisioned with the financial account(s) selected by the card member.

After the smart payment card 201 has been provisioned with biometric information and at least one financial account of the card member as described above, the card member may be presented, via the user interface displayed at the end-user device 203, with one or more additional options for further configuring the smart payment card 201.

For example, as one possibility, the end-user device 203 may present one or more user interface views for provisioning the smart payment card with biometric information for an additional card member. In some implementations, the additional card member may also be a customer of the financial institution and may have also been approved to use a smart payment card (e.g., the smart payment card 201 or a different smart payment card). In such implementations, the additional card member may initiate the process for configuring the smart payment card 201 as described above with reference to FIG. 3 and steps 301-313 to register the dongle 202 to an existing user account of the additional card member and provision the smart payment card 201 with biometric information and financial account information of the additional card member. In this respect, the smart payment card 201 may store a respective card member profile for each card member that is associated with the smart payment card 201. Thereafter, when a biometric input is provided to use the smart payment card 201 for a transaction, the smart payment card 201 may determine which card member profile should be utilized for the transaction and then display or transmit financial account information based on that card member profile.

Advantageously, the disclosed smart payment card is not limited by physical constraints typically imposed upon existing payment cards. For instance, in line with the discussion above, a single smart payment card as disclosed herein may be configured to store information about multiple financial accounts for a given card member, and perhaps even financial account information for multiple card members.

As another possibility, the end-user device 203 may present one or more user interface views for configuring other features and/or behaviors of the smart payment card 201 that may serve to provide enhanced security measures for the smart payment card 201.

As one example, the end-user device 203 may present a user interface view for configuring biometric input patterns that may dictate how the smart payment card 201 behaves. For instance, the smart payment card 201 may be configured to perform certain actions based on timing and length of biometric inputs that are provided via the biometric sensor. For example, the card member may configure the smart payment card 201 to (i) activate the display and present financial account options based on a first input comprising a first amount of time (e.g., a fingerprint tap provided for less than 2 seconds), (ii) select a given financial account based on a second input comprising a second amount of time (e.g., a fingerprint hold provided between 2-4 seconds), and (iii) process a transaction based on a third input comprising a third amount of time (e.g., a fingerprint hold provided for more than 4 seconds).

As another example, the card member may configure the smart payment card 201 to identify a financial transaction as either a card-present transaction or a card-not-present transaction based on timing and length of an initial biometric input that is provided via the biometric sensor. For instance, the card member may configure the smart payment card 201 to identify a first type of input (e.g., a long fingerprint hold comprising 3 or more seconds) as a request to process a card-not-present transaction and a second type of input (e.g., a short fingerprint press comprising 2 seconds) as a request to process a card-present transaction. In such an instance, when the smart payment card 201 detects a biometric input while in an idle state, if the biometric input comprises a long hold, the smart payment card 201 may determine that the financial transaction is a card-not-present transaction and may thus activate the display to present a virtual account number or, if the smart payment card 201 has been provisioned with multiple financial accounts, options to select a given financial account for which a virtual account number is to be displayed. On the other hand, if the biometric input comprises a short press, the smart payment card 201 may determine that the financial transaction is a card-present transaction and may either proceed to transmit financial account information to a point-of-sale device that is coupled with the smart payment card 201 or, if the smart payment card 201 has been provisioned with multiple financial accounts, activate the display to present options to select a given financial account, and upon being coupled with the a point-of-sale device, transmit financial account information for the given financial account to the point-of-sale device.

As yet another example, the card member may configure the smart payment card 201 to draw power from a power source based on timing and length of biometric inputs. For instance, the smart payment card 201 may be configured such that when coupled with a point-of-sale device for a card-present transaction, the smart payment card 201 may, in response to a first biometric input (first fingerprint tap) draw a first amount of power for activating the display and enabling selection of a given financial account, and in response to a second biometric input (second fingerprint tap) draw a second amount of power for processing the transaction.

Still, as yet another example, the end-user device 203 may present a user interface view for configuring a proximity detection feature of the smart payment card 201. For instance, the smart payment card 201 may be configured to wirelessly pair with an "anchor" device during card-present transactions such that the smart payment card 201 communicates with the anchor device while coupled with a point-of-sale device and causes an alert to be provided to the card member if the smart payment card 201 and the anchor device are determined to be outside a threshold range of one another. The anchor device may be a computing device that is capable of wirelessly communicating with the smart payment card 201, such as the end-user device 203 (e.g., the card member's smartphone). Detecting the proximity between the smart payment card 201 and the end-user device 203 may take various forms. In one implementation, if the proximity feature has been activated, at the time a transaction is initiated, the smart payment card 201 may establish a wireless connection with the end-user device 203 and then the smart payment card 201 and/or the end-user device 203 may monitor a proximity between the end-user device 203 and the smart payment card 201. If the proximity exceeds a certain range, the end-user device 203 may provide an alert for the card member.

In another implementation, if the proximity feature has been activated, at the time a transaction is initiated, the smart payment card 201 may establish a wireless connection with the anchor device (e.g., the end-user device 203) and continue to broadcast a series of wireless signals to the end-user device 203 until the transaction is complete. If the end-user device 203 moves out of range such that the smart payment card 201 is unable to successfully broadcast a signal to the end-user device 203 within a given period of time, the end-user device 203 may provide an alert for the card member. In some instances, the smart payment card 201 may be configured to broadcast location information with each signal that is transmitted to the end-user device 203. In such instances, if the signals are disrupted, the end-user device 203 may additionally display the last-received location information for the smart payment card 201 to aid the card member in retrieving the smart payment card 201. Other examples are also possible.

Advantageously, the proximity detection feature may be used to alert the card member in an instance where the card member has moved away from the smart payment card 201 after it was used (e.g., inserted into a card reader at a point-of-sale device, obtained (e.g., from a wallet) for an online transaction, etc.) so as to remind the card member to retrieve the smart payment card 201. The feature can advantageously prevent the card member from losing or misplacing the smart payment card 201.

As yet another example of configuration options, the card member may configure the smart payment card 201 to require a continuous biometric input to process a transaction. For instance, in one implementation, the smart payment card 201 may be configured such that after a given financial account has been selected for a card-present transaction (e.g., either by virtue of being the only financial account provisioned on the smart payment card or by being affirmatively selected from a plurality of financial accounts by the card member), the card member may be required to provide a continuous biometric input (e.g., by maintaining a coupling with the biometric sensor) from the time that processing of the transaction begins (e.g., when the smart payment card 201 is coupled with a point-of-sale device) until the time the transaction is complete (e.g., after the smart payment card 201 has transmitted financial account information to the point-of-sale device and the transaction is authorized). In such an implementation, if the biometric input is interrupted before the transaction is complete (e.g., the card member's finger is disconnected from the biometric sensor), the smart payment card 201 may cease processing the transaction. In some implementations, the smart payment card 201 may be configured to provide a notification to the card member to provide a continuous biometric input. For instance, the smart payment card 201 may present, via the display of the smart payment card 201, an instruction for the card member to continue providing the biometric input until the transaction is complete.

Advantageously, such a configuration of the smart payment card 201 may prevent an unauthorized user from utilizing the smart payment card 201 after the card member has provided an initial biometric input to request processing of a transaction.

The smart payment card 201 may be configured in other ways as well.

d. Processing Financial Transactions Involving a Smart Payment Card

Figure 4:
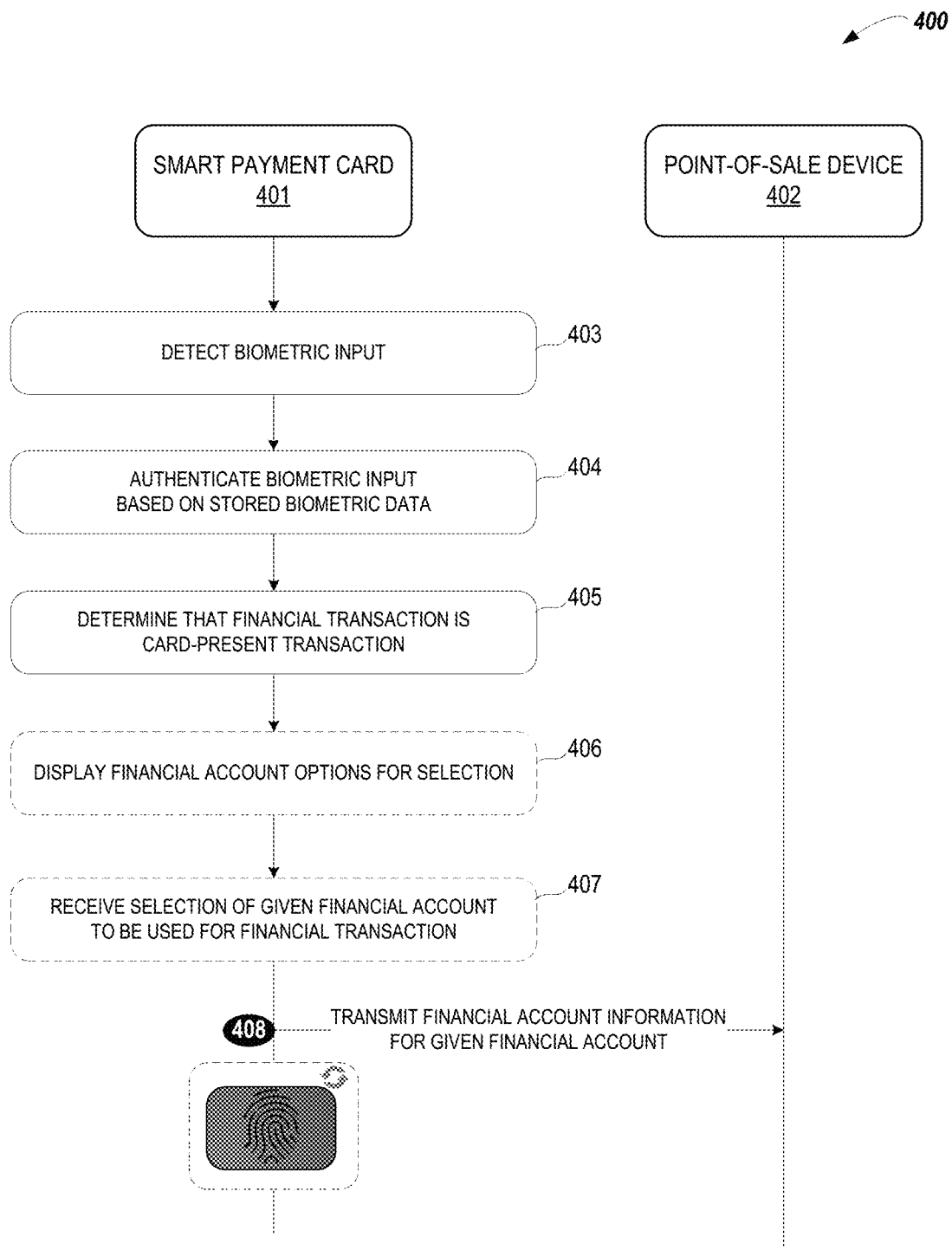
FIG. 4 depicts one embodiment of an example process for processing a financial transaction that involves a smart payment card in accordance with the disclosed technology.
Figure 5:
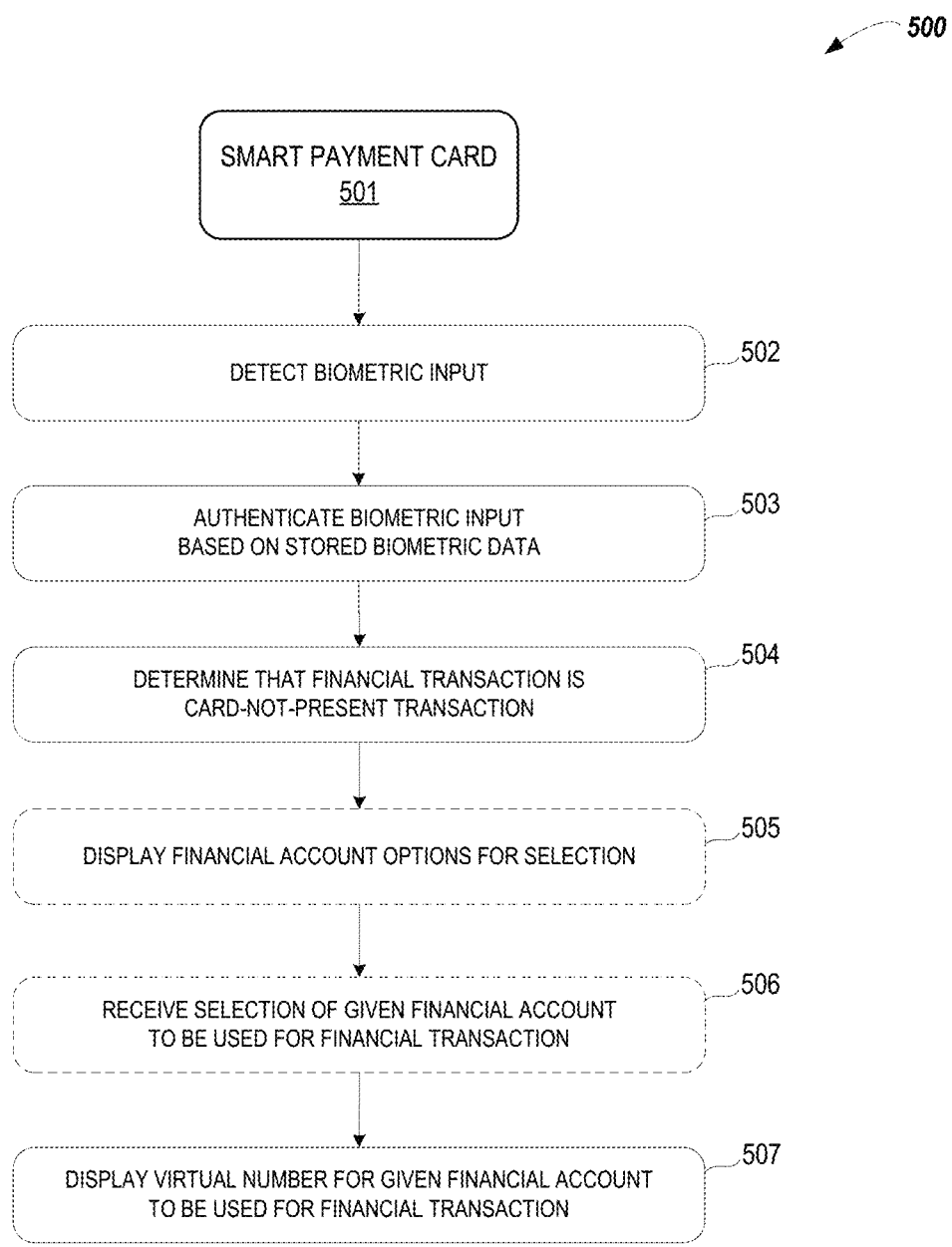
FIG. 5 depicts another embodiment of an example process for processing a financial transaction that involves a smart payment card in accordance with the disclosed technology.

After the smart payment card 201 has been configured in line with the discussion above, the smart payment card 201 may be utilized by the card member to process financial transactions. The functions for processing a financial transaction that involves the smart payment card 201 may take various forms and may depend on the type of transaction that is being conducted. FIGS. 4 and 5 depict flow diagrams of example processes 400 and 500, respectively, for processing financial transactions.

The example processes 400 and 500 may include one or more operations, functions, or actions as illustrated by one or more of steps 403-408 and 502-507. Although steps 403-408 and 502-507 are illustrated in sequential order, these steps may also be performed in parallel, and/or in a different order than those described herein. Also, the various steps may be combined into fewer steps, divided into additional steps, and/or removed based upon the desired implementation.

In addition, for the example processes 400 and 500, the flow diagrams show functionality and operation of two possible implementations of embodiments described herein. In this regard, each step may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable medium may also be any other volatile or non-volatile storage systems. The computer-readable medium may be considered a computer-readable storage medium, for example, or a tangible storage device. In addition, for the example processes 400 and 500, each step shown in FIG. 4 and FIG. 5 may represent circuitry that is wired to perform the specific logical functions in the process.

With reference first to FIG. 4, an example process 400 for processing card-present transactions in accordance with the disclosed technology and techniques is shown. The example process 400 may involve a smart payment card 401 and a point-of-sale device 402. The smart payment card 401 may be resemble the smart payment card 101 or the smart payment card 201 described above with reference to FIGS. 1A-1B and FIG. 2 and may have been provisioned with biometric data and financial account information associated with a card member as described above with reference to FIG. 3.

The example process 400 may begin at step 403, wherein the smart payment card 401 may detect a biometric input provided at a biometric sensor of the smart payment card 401. The biometric input may indicate a request to process a financial transaction. In line with the discussion above, the biometric input may take various forms, including a fingerprint, a retinal scan, or a facial recognition, among other possibilities.

At step 404, the smart payment card 401 may authenticate the biometric input to determine if the detected biometric input was provided by the card member associated with the smart payment card 401. Authenticating the biometric input may take various forms. In line with the discussion above, the smart payment card 401 may authenticate the biometric input by comparing the biometric input to biometric data stored in a memory of the smart payment card 401, which may have been previously captured and stored by the smart payment card 401 during a configuration process as described above with reference to FIG. 3. If the biometric input matches the stored biometric data, the smart payment card 401 may determine that the biometric input is authentic.

At step 405, the smart payment card 401 may determine that the financial transaction is a card-present transaction. The function of determining that the financial transaction is a card-present transaction may take various forms. For instance, as one possibility, the smart payment card 401 may determine that the financial transaction is a card-present transaction based on detecting the point-of-sale device 402 via a wireless communication component of the smart payment card 401. As another possibility, the smart payment card 401 may determine that the financial transaction is a card-present transaction based on a length of time for which the biometric input was provided at step 403. Other examples are also possible.

If the smart payment card 401 is provisioned with a single given financial account, the example process 400 may proceed to step 408, where the smart payment card 401 may transmit, to the point-of-sale device 402, financial account information for the given financial account. The financial account information may include, for example, a PAN, an expiration date, and/or a CVV, that may be used to complete the financial transaction. In an implementation where the smart payment card 401 has been configured to require continuous biometric input, the smart payment card 401 may continue to scan for the presence of the biometric input until the financial transaction has been completed.

Returning to step 405, if the smart payment card 401 is provisioned with two or more financial accounts, the example process 400 may proceed to step 406, where the smart payment card 401 may present, via a display of the smart payment card 401, financial account options from which the card member may select a given financial account that is to be used for the financial transaction. In line with the discussion above, the options that are presented may comprise proxy identifiers of the financial accounts.

At step 407, the smart payment card 401 may receive an indication of a given financial account that has been selected to be used for the financial transaction (e.g., a given financial account to which payment for the financial transaction is to be charged). In line with the discussion above, the given financial account may be selected using one or more components of the smart payment card 401, such as the biometric sensor or a selector element.

After receiving the selection of the given financial account, the example process may proceed to step 408, where the smart payment card 401 may transmit, to the point-of-sale device 402, financial account information for the given financial account as discussed above.

Although not shown in FIG. 4, in an implementation where the smart payment card 401 is configured for proximity detection, after receiving the indication of the given financial account at step 407, the smart payment card 401 may establish a wireless communication link with a designated anchor device for monitoring a proximity of the smart payment card 401 and the anchor device to determine whether the two devices remain within a threshold range of each other until the financial transaction is complete. Advantageously, the proximity detection feature may cause the card member to be alerted in the event that the smart payment card 401 is inadvertently forgotten (e.g., near a card reader device, or while inserted into a card reader device, etc.) or misplaced.

With reference now to FIG. 5, an example process 500 for processing card-not-present transactions in accordance with the disclosed technology and techniques is shown. The example process 500 may involve a smart payment card 501. The smart payment card 501 may resemble the smart payment card 101, the smart payment card 201, or the smart payment card 401 described above with reference to FIGS. 1A-1B, FIG. 2, and FIG. 4, and may have been provisioned with biometric data and financial account information associated with a card member as described above with reference to FIG. 3.

The example process 500 may begin at step 502, wherein the smart payment card 501 may detect a biometric input provided at a biometric sensor of the smart payment card 501. The biometric input may indicate a request to process a financial transaction. In line with the discussion above, the biometric input may take various forms, including a fingerprint, a retinal scan, or a facial recognition.

At step 503, the smart payment card 501 may authenticate the biometric input to determine if the detected biometric input was provided by the card member associated with the smart payment card 501. Authenticating the biometric input may take various forms. In line with the discussion above, the smart payment card 501 may authenticate the biometric input by comparing the biometric input to biometric data stored in a memory of the smart payment card 501, which may have been previously captured and stored by the smart payment card 501 during a configuration process as described above with reference to FIG. 3. If the biometric input matches the stored biometric data, the smart payment card 501 may determine that the biometric input is authentic.

At step 504, the smart payment card 501 may determine that the financial transaction is a card-not-present transaction. The function of determining that the financial transaction is a card-present transaction may take various forms. For instance, as one possibility, the smart payment card 501 may determine that the financial transaction is a card-not-present transaction based on scanning for a point-of-sale device via a wireless communication component of the smart payment card 501 and failing to detect any point-of-sale device within a given proximity of the smart payment card 501. As another possibility, the smart payment card 501 may determine that the financial transaction is a card-not-present transaction based on a length of time for which the biometric input was provided at step 502. Other examples are also possible.

If the smart payment card 501 is provisioned with a single given financial account, the example process 500 may proceed to step 507, where the smart payment card 501 may present, via a display of the smart payment card 501, a virtual account number for the given financial account. The display may also present an expiration date and/or a CVV that may be used along with the virtual account number to complete the financial transaction.

Returning to step 504, if the smart payment card 501 is provisioned with two or more financial accounts, the example process 500 may proceed to step 505, where the smart payment card 501 may present, via the display, financial account options from which the card member may select a given financial account that is to be used for the financial transaction. In line with the discussion above, the options that are presented may comprise proxy identifiers of the financial accounts.

At step 506, the smart payment card 501 may receive an indication of a given financial account that has been selected to be used for the financial transaction (e.g., a given financial account to which payment for the financial transaction is to be charged). In line with the discussion above, the given financial account may be selected using one or more components of the smart payment card 501, such as the biometric sensor or a selector element.

After receiving the selection of the given financial account, the example process may proceed to step 507, where the smart payment card 501 may present, via a display of the smart payment card 501, a virtual account number for the given financial account, perhaps in addition to an expiration date and/or a CVV that may be used along with the virtual account number to complete the financial transaction.

Figure 6:
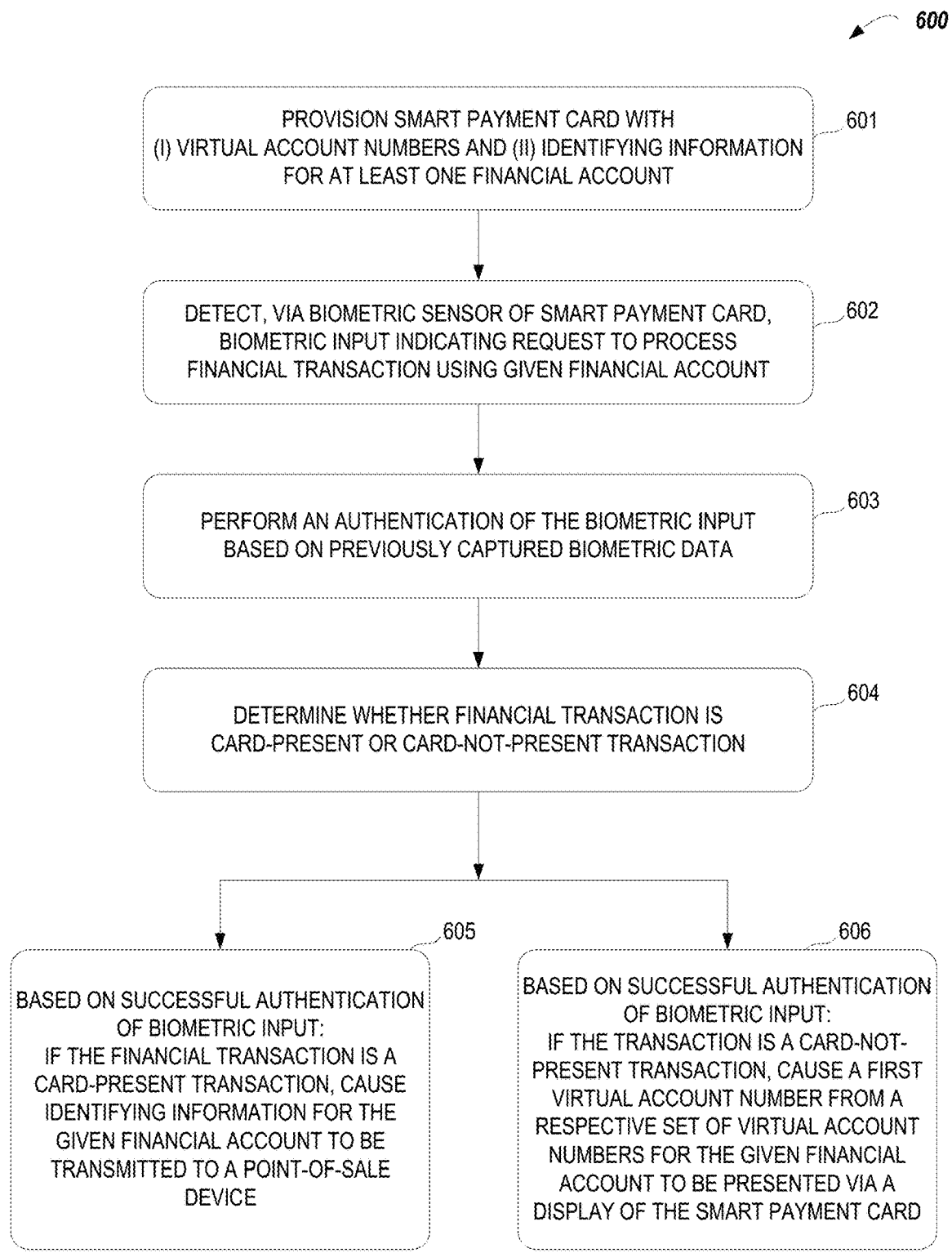
FIG. 6 depicts one embodiment of an example process for provisioning a smart payment card, authenticating a request to process a financial transaction involving the smart payment card, and processing a financial transaction in accordance with the disclosed technology.

Turning now to FIG. 6, a flowchart of an example process 600 for carrying out various techniques disclosed herein is shown. The example process 600 may include one or more operations, functions, or actions as illustrated by one or more of blocks 601-605. Although blocks 601-605 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example process 600, the flowchart shows functionality and operation of one possible implementation of embodiments described herein. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the example process 600, each block shown in FIG. 6 may represent circuitry that is wired to perform the specific logical functions in the process.

The example process 600 includes operations that may be carried out to facilitate one or more techniques disclosed herein, including (i) provisioning a smart payment card with financial account information, virtual account numbers, and biometric data, (ii) authenticating a request to process a financial transaction involving the smart payment card, and (iii) processing the financial transaction. In line with the discussion above, for the examples that follow, the example process 600 may be carried out by one or more computing devices of a computing system that includes the disclosed smart payment card and is configured to operate in accordance with aspects of the disclosed technology, such as the computing environment 200 shown in FIG. 2.

The example process 600 may begin at block 601, wherein the computing system may provision a smart payment card with at least (i) identifying information for at least one financial account associated with a card member and (ii) a set of virtual account numbers corresponding to the financial account(s). The smart payment card may be provisioned in line with the discussion above with reference to FIG. 3, which may generally involve: causing an end-user device associated with the card member to display a user interface for provisioning smart payment cards; determining that the smart payment card has been communicatively coupled to the end-user device via a computing device; capturing, via the biometric sensor of the smart payment card, the biometric data of the card member that is to be used to authenticate requests to process financial transactions; causing the end-user device to display one or more financial accounts associated with the card member; receiving, via the user interface displayed at the end-user device, an indication of at least one financial account that has been selected for provisioning on the smart payment card; for each selected financial account, obtaining a set of virtual account numbers that are approved for card-not-present transactions; and causing (i) identifying information for each selected financial account and (ii) a set of virtual account numbers for each selected financial account to be provisioned on the smart payment card via the computing device.

At block 602, the computing system may detect, via a biometric sensor of the smart payment card, a biometric input indicating a request to process a financial transaction using a given financial account that has been provisioned on the smart payment card.

At block 603, the computing system may perform an authentication of the biometric input based on previously captured biometric data of the card member. In line with the discussion above, the previously captured biometric data may be stored in a memory of the smart payment card.

At block 604, the computing system may determine whether the financial transaction is a card-present transaction or a card-not-present transaction. In line with the discussion above, the computing system may make this determination in various ways, such as based on a length of the biometric input or based on determining whether a point-of-sale device is within a threshold proximity of the smart payment card, among other possibilities.

If the financial transaction is a card-present transaction, then at block 605, based on successfully authenticating the biometric input, the computing system may cause identifying information for the given financial account to be transmitted to a point-of-sale device. On the other hand, if the financial transaction is a card-not-present transaction, then at block 606, based on successfully authenticating the biometric input, the computing system may cause a first virtual account number from a respective set of virtual account numbers for the given financial account to be presented via a display of the smart payment card.

e. Example Computing Platform and End-User Device

Figure 7:
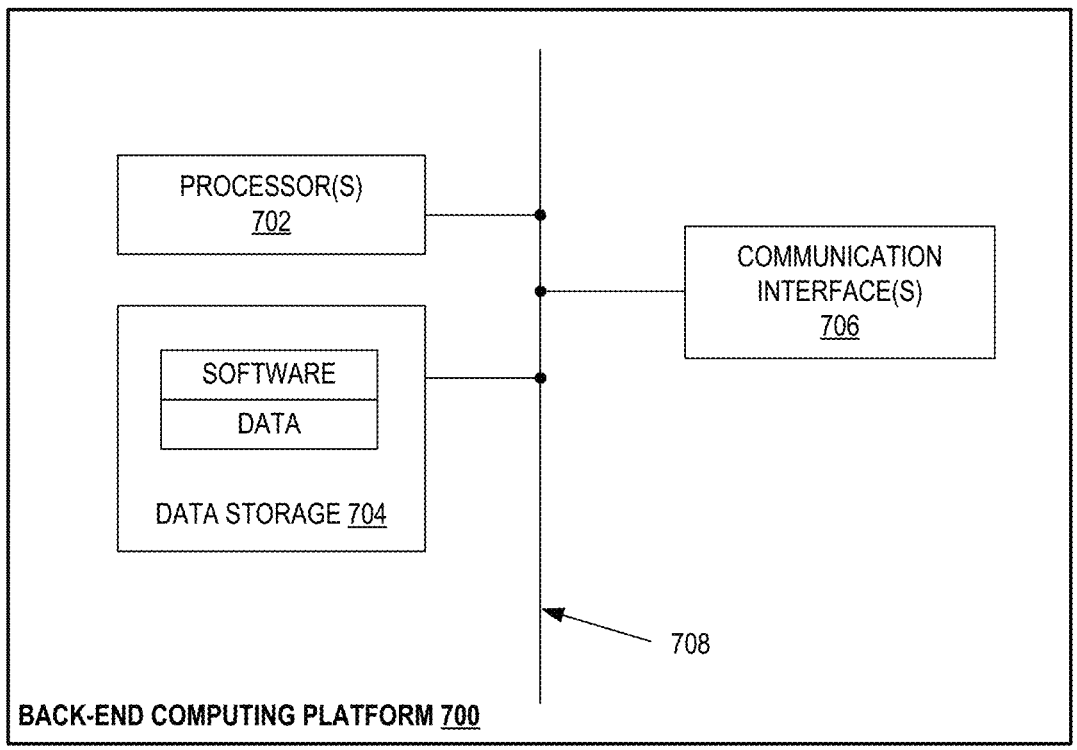
FIG. 7 a structural diagram of an example computing platform that may be configured to carry out one or more functions in accordance with the disclosed technology.

Turning now to FIG. 7, a simplified block diagram is provided to illustrate some structural components that may be included in an example back-end computing platform 700 that may be configured to carry out any of the various functions disclosed herein, including but not limited to any of the functions described above with reference to FIG. 3. At a high level, the example back-end computing platform 700 may generally comprise any one or more computing systems that collectively include one or more processors 702, data storage 704, and one or more communication interfaces 706, all of which may be communicatively linked by a communication link 708 that may take the form of a system bus, a communication network such as a public, private, or hybrid cloud, or some other connection mechanism. Each of these components may take various forms.

The one or more processors 702 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 702 could comprise processing components that are distributed across a plurality of physical computing systems connected via a network.

In turn, the data storage 704 may comprise one or more non-transitory computer-readable storage mediums that are collectively configured to store (i) program instructions that are executable by one or more processors 702 such that back-end computing platform 700 is configured to perform any of the various functions disclosed herein, and (ii) data that may be received, derived, or otherwise stored, for example, in one or more databases, file systems, repositories, or the like, by back-end computing platform 700, in connection with performing any of the various functions disclosed herein. In this respect, the one or more non-transitory computer-readable storage mediums of the data storage 704 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 704 may comprise computer-readable storage mediums that are distributed across a plurality of physical computing systems connected via a network.

Figure 8:
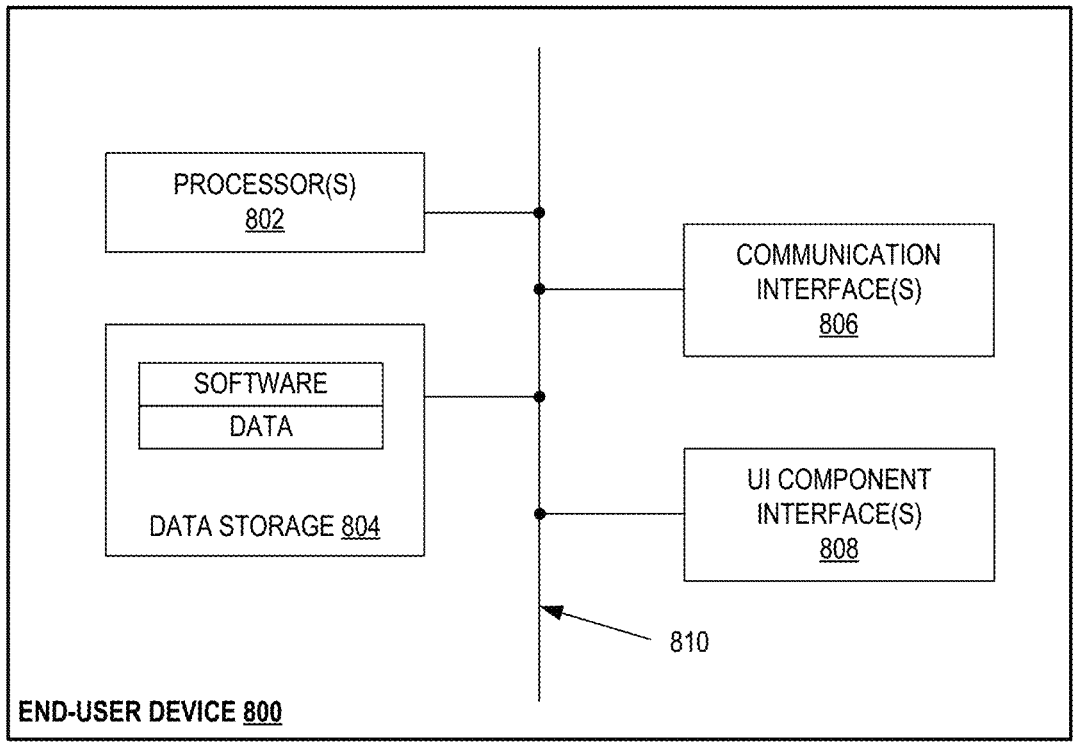
FIG. 8 depicts a structural diagram of an example end-user device that may be configured to communicate with the example computing platform of FIG. 6 and also carry out one or more functions in accordance with the disclosed technology.

The one or more communication interfaces 706 may be configured to facilitate wireless and/or wired communication with other systems and/or devices, such as end-user devices (e.g., one or more end-user devices 800 of FIG. 8). Additionally, in an implementation where the back-end computing platform 700 comprises a plurality of physical computing systems connected via a network, the one or more communication interfaces 706 may be configured to facilitate wireless and/or wired communication between these physical computing systems (e.g., between computing and storage clusters in a cloud network). As such, the one or more communication interfaces 706 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the back-end computing platform 700 may additionally include or have an interface for connecting to one or more user-interface components that facilitate user interaction with the back-end computing platform 700, such as a keyboard, a mouse, a trackpad, a display screen, a touch-sensitive interface, a stylus, a virtual-reality headset, and/or one or more speaker components, among other possibilities.

It should be understood that the back-end computing platform 700 is one example of a computing platform that may be used with the embodiments described herein. Numerous other arrangements are possible and contemplated herein. For instance, in other embodiments, the back-end computing platform 700 may include additional components not pictured and/or more or fewer of the pictured components.

Turning next to FIG. 8, a simplified block diagram is provided to illustrate some structural components that may be included in an example end-user device 800, such as an end-user device used by a card member during any of the processes 300, 400, or 500 described above with reference to FIGS. 3, 4, and 5. As shown in FIG. 8, the end-user device 800 may include one or more processors 802, data storage 804, one or more communication interfaces 806, and one or more user-interface components 808, all of which may be communicatively linked by a communication link 810 that may take the form of a system bus or some other connection mechanism. Each of these components may take various forms.

The one or more processors 802 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 804 may comprise one or more non-transitory computer-readable storage mediums that are collectively configured to store (i) program instructions that are executable by the processor(s) 802 such that the end-user device 800 is configured to perform certain functions related to interacting with and accessing services provided by a computing platform, and (ii) data that may be received, derived, or otherwise stored, for example, in one or more databases, file systems, repositories, or the like, by the end-user device 800, related to interacting with and accessing services provided by a computing platform. In this respect, the one or more non-transitory computer-readable storage mediums of the data storage 804 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 804 may take other forms and/or store data in other manners as well.

The one or more communication interfaces 806 may be configured to facilitate wireless and/or wired communication with other computing devices. The communication interface(s) 806 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 800 may additionally include or have interfaces for one or more user-interface components 808 that facilitate user interaction with the end-user device 800, such as a keyboard, a mouse, a trackpad, a display screen, a touch-sensitive interface, a stylus, a virtual-reality headset, and/or one or more speaker components, among other possibilities.

It should be understood that the end-user device 800 is one example of an end-user device that may be used to interact with an example computing platform as described herein. Numerous other arrangements are possible and contemplated herein. For instance, in other embodiments, the end-user device 800 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A smart payment card comprising:
a biometric sensor;
a display;
at least one processor;
at least one non-transitory computer-readable medium; and
program instructions stored on the at least one non-transitory computer-readable medium that, when executed by the at least one processor, cause the smart payment card to:
receive, from a computing system, a set of identifying information for a given financial account associated with a given card member;
store the set of identifying information for the given financial account associated with the given card member;
detect, via the biometric sensor, one or more biometric inputs collectively indicating a request to initiate a financial transaction using the smart payment card;
perform an authentication of the one or more biometric inputs based on stored biometric data for the given card member and thereby determine that the authentication is successful; and
based on the successful authentication of the one or more biometric inputs, either:
cause at least a subset of the stored set of identifying information for the given financial account to be transmitted to a point-of-sale device if the financial transaction is a card-present financial transaction; or
cause a given virtual account number corresponding to the given financial account to be presented via the display of the smart payment card if the financial transaction is a card-not-present financial transaction.

2. The smart payment card of claim 1, wherein the computing system comprises an end-user device that is connected to the smart payment card via a dongle device.

3. The smart payment card of claim 1, wherein the set of identifying information for the given financial account includes one or more of (i) a payment account number corresponding to the given financial account, (ii) an expiration date corresponding to the given financial account, or (iii) a card verification value corresponding to the given financial account.

4. The smart payment card of claim 1, further comprising program instructions stored on the at least one non-transitory computer-readable medium that, when executed by the at least one processor, cause the smart payment card to:
receive, from the computing system, a given set of virtual account numbers corresponding to the given financial account, wherein the given virtual account number is selected from the given set of virtual account numbers.

5. The smart payment card of claim 1, further comprising program instructions stored on the at least one non-transitory computer-readable medium that, when executed by the at least one processor, cause the smart payment card to:
generate a given set of virtual account numbers corresponding to the given financial account, wherein the given virtual account number is selected from the given set of virtual account numbers.

6. The smart payment card of claim 1, wherein the given virtual account number is approved for a single use.

7. The smart payment card of claim 6, wherein the given virtual account number is selected from a given set of virtual account numbers corresponding to the given financial account that are to be used for facilitating card-not-present financial transactions using the smart payment card, and wherein the smart payment card further comprises program instructions stored on the at least one non-transitory computer-readable medium that, when executed by the at least one processor, cause the smart payment card to:
after a threshold extent of virtual account numbers in the given set of virtual account numbers have been utilized by the smart payment card, either receive or generate one or more new virtual account numbers corresponding to the given financial account.

8. The smart payment card of claim 1, further comprising program instructions stored on the at least one non-transitory computer-readable medium that, when executed by the at least one processor, cause the smart payment card to:
prior to detecting the one or more biometric inputs, detect, via the biometric sensor, a biometric input that is provided by the given card member during a provisioning process for the smart payment card; and
based on the detected biometric input, generate and store the biometric data for the given card member.

9. The smart payment card of claim 1, further comprising program instructions stored on the at least one non-transitory computer-readable medium that, when executed by the at least one processor, cause the smart payment card to:
receive, from the computing system, a respective set of identifying information for each of one or more additional financial accounts associated with the given card member; and
store the respective set of identifying information for each of the one or more additional financial accounts associated with the given card member, wherein the given financial account is thereafter selected by a user of the smart payment card from a group of financial account options that includes the given financial account and the one or more additional financial accounts.

10. The smart payment card of claim 1, wherein the stored biometric data for the given card member comprises fingerprint data for the given card member, and wherein the one or more biometric inputs comprises one or more fingerprint inputs.

11. The smart payment card of claim 1, further comprising program instructions stored on the at least one non-transitory computer-readable medium that, when executed by the at least one processor, cause the smart payment card to:
after performing the authentication of the one or more biometric inputs, present, via the display, two or more financial account options from which the given financial account may be selected; and
receive, via the biometric sensor, user input indicating selection of the given financial account.

12. The smart payment card of claim 11, wherein the user input indicating the selection of the given financial account comprises one or more tap inputs or a hold input provided via the biometric sensor.

13. The smart payment card of claim 1, further comprising program instructions stored on the at least one non-transitory computer-readable medium that, when executed by the at least one processor, cause the smart payment card to:
  determine that the financial transaction is a card-present financial transaction based on detecting the point-of-sale device within a threshold proximity of the smart payment card.

14. A method carried out by a smart payment card, the method comprising:
  receiving, from a computing system, a set of identifying information for a given financial account associated with a given card member;
  storing the set of identifying information for the given financial account associated with the given card member;
  detecting, via a biometric sensor, one or more biometric inputs collectively indicating a request to initiate a financial transaction using the smart payment card;
  performing an authentication of the one or more biometric inputs based on stored biometric data for the given card member and thereby determine that the authentication is successful; and
  based on the successful authentication of the one or more biometric inputs, either:
    causing at least a subset of the stored set of identifying information for the given financial account to be transmitted to a point-of-sale device if the financial transaction is a card-present financial transaction; or
    causing a given virtual account number corresponding to the given financial account to be presented via a display of the smart payment card if the financial transaction is a card-not-present financial transaction.

15. The method of claim 14, wherein the computing system comprises an end-user device that is connected to the smart payment card via a dongle device.

16. The method of claim 14, wherein the set of identifying information for the given financial account includes one or more of (i) a payment account number corresponding to the given financial account, (ii) an expiration date corresponding to the given financial account, or (iii) a card verification value corresponding to the given financial account.

17. The method of claim 14, further comprising:
  receiving, from the computing system, a given set of virtual account numbers corresponding to the given financial account, wherein the given virtual account number is selected from the given set of virtual account numbers.

18. The method of claim 14, further comprising:
  generating a given set of virtual account numbers corresponding to the given financial account, wherein the given virtual account number is selected from the given set of virtual account numbers.

19. The method of claim 14, wherein the given virtual account number is approved for a single use.

20. The method of claim 19, wherein the given virtual account number is selected from a given set of virtual account numbers corresponding to the given financial account that are to be used for facilitating card-not-present financial transactions using the smart payment card, the method further comprising:
  after a threshold extent of virtual account numbers in the given set of virtual account numbers have been utilized by the smart payment card, either receiving or generating one or more new virtual account numbers corresponding to the given financial account.

* * * * *